US011337094B2

(12) United States Patent
Wu et al.

(10) Patent No.: US 11,337,094 B2
(45) Date of Patent: May 17, 2022

(54) INTERFERENCE MEASUREMENT REPORTING METHOD, DEVICE, AND SYSTEM

(71) Applicant: HUAWEI TECHNOLOGIES CO., LTD., Shenzhen (CN)

(72) Inventors: Ming Wu, Shenzhen (CN); Chi Zhang, Shanghai (CN); Yi Qin, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 109 days.

(21) Appl. No.: 16/713,078

(22) Filed: Dec. 13, 2019

(65) Prior Publication Data

US 2020/0120529 A1 Apr. 16, 2020

Related U.S. Application Data

(63) Continuation of application No. PCT/CN2018/090498, filed on Jun. 8, 2018.

(30) Foreign Application Priority Data

Jun. 16, 2017 (CN) ......................... 201710459705.3

(51) Int. Cl.
*H04W 24/10* (2009.01)
*H04B 17/336* (2015.01)
(Continued)

(52) U.S. Cl.
CPC .......... *H04W 24/10* (2013.01); *H04B 17/336* (2015.01); *H04L 1/0026* (2013.01); *H04L 5/0051* (2013.01); *H04W 76/11* (2018.02)

(58) Field of Classification Search
CPC .... H04W 24/10; H04W 76/11; H04B 17/336; H04L 5/0051; H04L 1/0026
See application file for complete search history.

(56) References Cited

U.S. PATENT DOCUMENTS 9,979,456 B1 * 5/2018 Akoum ................ H04B 7/0632
2010/0317363 A1 * 12/2010 Bai .................. H04W 72/0413 455/452.2

(Continued)

FOREIGN PATENT DOCUMENTS

CN 102281086 A 12/2011
CN 103781017 A 5/2014

(Continued)

OTHER PUBLICATIONS https://www.ericsson.com/en/blog/2020/6/cross-link-interference-tdd-networks; Jun. 2020; Cross-link interference in TDD networks and what to do about it; Sathya Venkatasubramanian, Senior Researcher; Olav Queseth, Master Researcher (Year: 2020).*

(Continued)

*Primary Examiner* — Deepa Belur
(74) *Attorney, Agent, or Firm* — Rimon PC

(57) ABSTRACT

An interference measurement reporting method, device, and system related to the field of communications technologies are disclosed. The method includes after receiving first information sent by a second device, sending, by a first device, at least one reported value to a third device. The first information is used to indicate an interference measurement resource to the first device. And the reported value is obtained based on an interference measurement result that is located on a portion the resource. Because the reported value is obtained based on the interference measurement performed on a specific resource of which the first device is notified previously, when the technical solution is applied to cross interference measurement, for example, inter-UE interference measurement, the first device can report accurate information about inter-UE interference status to a base station.

16 Claims, 12 Drawing Sheets

1
2
3
4
1
2
3
4
1
2
3
4
Comb resource 1
Comb resource 2
Comb resource 3
Comb resource 4

(51) Int. Cl.
*H04W 76/11* (2018.01)
*H04L 1/00* (2006.01)
*H04L 5/00* (2006.01)

(56) References Cited

U.S. PATENT DOCUMENTS

2013/0242902 A1 9/2013 Liu et al.
2015/0103706 A1* 4/2015 Li .......................... H04W 16/10 370/280
2015/0280877 A1 10/2015 Chen et al.
2015/0319636 A1 11/2015 Lee et al.
2016/0174096 A1 6/2016 Khoshnevis et al.
2017/0006492 A1 1/2017 Khoshnevisan et al.
2017/0012691 A1 1/2017 Lee et al.
2017/0257177 A1 9/2017 Noh et al.
2017/0338878 A1 11/2017 Gao et al.
2019/0273600 A1* 9/2019 Wang ................... H04B 17/345

FOREIGN PATENT DOCUMENTS

CN 104885502 A 9/2015
CN 105680999 A 6/2016
CN 108809454 A 11/2018
WO WO-2011093671 A2 * 8/2011 ........... H04L 5/0035
WO 2013129843 A1 9/2013
WO 2016060466 A1 4/2016
WO WO-2018010123 A1 * 1/2018 ............ H04W 36/30

OTHER PUBLICATIONS

Nokia et al: “Interference estimation options and configuration in NR”, 3GPP DRAFT; R1-1708917, May 14, 2017, total 6 pages.
ZTE, “Discussion on Measurements and RS Design for CLI Mitigation”,3GPP TSG RAN WG1 Meeting #89 R1-1707204,Hangzhou, P.R.China, May 15, 2017,total 9 pages.
Samsung: “Cross-link interference management based on UE measurements”, 3GPP DRAFT; R1-1708055,May 14, 2017, XP051273251,total 4 pages.
Mediatek Inc: “Cross link interference measurements”, 3GPP DRAFT; R1-1707839,May 14, 2017,XP051273040,total 7 pages.

* cited by examiner

INTERFERENCE MEASUREMENT REPORTING METHOD, DEVICE, AND SYSTEM

CROSS-REFERENCE TO RELATED APPLICATIONS

This application is a continuation of International Application No. PCT/CN2018/090498, filed on Jun. 8, 2018, which claims priority to Chinese Patent Application No. 201710459705.3 filed on Jun. 16, 2017. The disclosures of the aforementioned applications are hereby incorporated by reference in their entireties.

TECHNICAL FIELD

This application relates to the field of communications technologies, and in particular, to reporting of interference measurements.

BACKGROUND

In a long term evolution-advanced (LTE-A) system, an interference measurement is reported in two manners: class A (CLASS A) and class B (CLASS B). For the class A reporting manner, in a channel state information (CSI) process, a base station configures a channel state information reference signal (CSI-RS) resource and a channel state information interference measurement (CSI-IM) resource for a terminal device. If the terminal device configures a CSI subframe set, the base station configures at most two CSI-IM resources for the terminal device in one CSI process. For the class B reporting manner, in one CSI process, the base station configures one or more CSI-RS resources and one or more CSI-IM resources for a terminal device. In both the class A and the class B reporting manners, when reporting interference measurement, the terminal device selects and reports an interference measurement result on one of the resources, and reports a CSI-RS resource indicator (CRI) corresponding to this resource.

To efficiently meet an actual requirement of a traffic volume of a network side device and improve resource utilization, a flexible duplex technology (including dynamic time division duplex (TDD)) is introduced in the prior art to separately configure uplink transmission and downlink transmission of each cell. In this case, uplink-downlink configurations of different cells may be different, and information transmission directions of neighboring cells are different, resulting in cross interference between uplink and downlink, that is, interference between transmission reception points (TRP) and interference between user equipments (UEs). Specifically, as shown in FIG. 1*a*, a terminal device 1 sends information to a base station 1 in a slot 2, and a base station 2 sends information to a terminal device 2 in the slot 2. Therefore, the slot 2 may be used for both uplink data transmission and downlink data transmission. However, because the terminal device 1 and the terminal device 2 may be close to each other, when the terminal device 1 sends information in the slot 2, such transmission will cause interference with the transmission received by the terminal device 2. The interference is inter-UE interference. When the base station 2 sends the information to the terminal device 2, such transmission may cause interference with the transmission received by the base station 1. The interference is inter-TRP interference. The inter-UE interference and the inter-TRP interference may be considered as cross interference. A cross interference scenario is also be shown in FIG. 1*b*. A general node B (gNB) sends information to a relay node (RN) 1, and a terminal device sends information to an RN2. When the gNB and the terminal device send the information in a same slot, the transmission sent by the terminal device interferes with the transmission sent to the RN1. Here the interference is also cross interference. When cross interference is relatively strong, normal data transmission fails. To solve this problem, simultaneous scheduling of terminal devices that have relatively strong inter-cell interference needs to be avoided. For example, coordination may be arranged by means of scheduling, beam forming, power adjustment, or the like. To perform coordination between base stations, the base stations need to know the conditions of the inter-UE interference and the inter-TRP interference.

Cross interference, such as inter-UE interference, is interference between uplink transmission and downlink transmission. However, in the prior art, interference measurement is mainly used to measure codirectional interference such as interference between downlink transmission and downlink transmission. The prior art interference measurement manner is unsuitable cross interference measurement.

SUMMARY

Embodiments of this application provide a reporting method, a device, and a system, applicable to cross interference measurement. This helps increase possibility of successful data transmission of a first device in a communication process.

According to a first aspect, an embodiment of this application provides a reporting method. The method includes:

receiving, by a first device, first information sent by a second device, and after receiving the first information sent by the second device, sending at least one reported value to a third device, where the first information is used to indicate an interference measurement resource to the first device, and the reported value is obtained based on an interference measurement result that is on a part of the resource.

In the foregoing technical solution, the first device can report, to the third device, the reported value obtained based on the interference measurement result that is on the part of the resource. Therefore, when the technical solution is applied to cross interference measurement, for example, inter-UE interference measurement, the terminal device can report a single inter-UE interference status to a base station. When obtaining, through measurement, measurement results of interference caused by a plurality of terminal devices to the terminal device, the terminal device can send a plurality of reported values to the base station, so that the base station obtains statuses of interference caused by the plurality of terminal devices to the terminal device, to help increase possibility of successful data transmission of the terminal device in a communication process.

Based on the first aspect, in a possible design, the resource indicated by the first information and used by the first device to perform interference measurement includes at least one of a time domain resource, a frequency domain resource, and a code domain resource.

In the foregoing technical solution, a resource can be multiplexed, to help save an interference measurement resource.

Based on the first aspect, in a possible design, the first device sends an identifier corresponding to the reported value to the third device, where the identifier is used to identify the part of the resource.

The foregoing technical solution helps distinguish an interference status that is on a part of the resource and that corresponds to the reported value.

Based on the first aspect, in a possible design, the first device receives second information sent by the second device, and sends the at least one reported value to the third device based on the second information, where the second information is used to indicate a reporting rule.

The foregoing technical solution ensures that the at least one reported value sent by the first device to the third device satisfy a requirement of the third device.

Based on the first aspect, in a possible design, the first device may further send the at least one reported value to the third device according to a predefined reporting rule.

The foregoing technical solution ensures that the at least one reported value sent by the terminal device to the third device satisfy a requirement of the third device.

In addition, it should be noted that in this embodiment of this application, the first device may further determine, based on both the reporting rule indicated by the second information and the predefined reporting rule, that the at least one reported value needs to be sent to the third device, that is, the first device sends the at least one reported value to the third device according to the reporting rule indicated by the second information and the predefined reporting rule.

Based on the first aspect, in a possible design, the reporting rule indicated by the second information or the predefined reporting rule is used to indicate at least one of a quantity of reported values, the identifier corresponding to the reported value, and a threshold, and the threshold is used to select the reported value.

In the foregoing technical solution, the reporting rule may include different classes. For example, a first-class reporting rule may be used to indicate a quantity of reported values, a second-class reporting rule is used to indicate an identifier corresponding to the reported value, and a third-class reporting rule is used to indicate a threshold. Therefore, in different statuses, the first device can report a corresponding reported value to the third device based on different classes of reporting rules, to satisfy communication requirements in different scenarios.

Based on the first aspect, in a possible design, the reported value is a channel quality indicator (CQI), reference signal received power (RSRP), reference signal received quality (RSRQ), a received signal strength indicator (RSSI), or channel state information (CSI).

Based on the first aspect, in a possible design, the first device is a terminal device, and the second device and the third device are a same access network device; or the first device is a terminal device, the second device is a relay device, and the third device is an access network device; or the first device is a terminal device, the second device is a first relay device, and the third device is a second relay device; or the first device is a first terminal device, the second device is an access network device, and the third device is a second terminal device; or the first device is a relay device, and the second device and the third device are a same access network device; or the first device is a first relay device, the second device is a second relay device, and the third device is an access network device.

The foregoing technical solution ensures that the technical solution in this embodiment of this application to be applied to different communication scenarios.

According to a second aspect, an embodiment of this application provides a report receiving method. The method includes:

sending, by a network side device, first information to a first device, and receiving at least one reported value sent by the first device, where the first information is used to indicate an interference measurement resource to the first device, and the reported value is obtained based on an interference measurement result that is on a part of the resource.

In the foregoing technical solution, the network side device can receive one or more reported values sent by the first device, where the reported value is obtained based on the interference measurement result that is on the part of the resource. Therefore, when the technical solution is applied to cross interference measurement, for example, inter-UE interference measurement, a base station can determine a single inter-UE interference status based on the reported value. When receiving a plurality of reported values, the base station can determine a single inter-UE interference status of the terminal device, to help increase possibility of successful data transmission of the terminal device in a communication process.

Based on the second aspect, in a possible design, the network side device receives an identifier that corresponds to the reported value and that is sent by the first device, where the identifier is used to identify the part of the resource.

The foregoing technical solution helps distinguish an interference status that is on a part of the resource and that corresponds to the reported value.

Based on the second aspect, in a possible design, the network side device sends second information to the first device, where the second information is used to indicate a reporting rule.

The foregoing technical solution helps the at least one reported value sent by the first device to the network side device satisfy a requirement of the network side device.

Based on the second aspect, in a possible design, the reporting rule is used to indicate at least one of a quantity of reported values, the identifier corresponding to the reported value, and a threshold, and the threshold is used to select the reported value.

In the foregoing technical solution, the reporting rule may include different classes. For example, a first-class reporting rule may be used to indicate a quantity of reported values, a second-class reporting rule is used to indicate an identifier corresponding to the reported value, and a third-class reporting rule is used to indicate a threshold. Therefore, in different statuses, the first device can report a corresponding reported value to the third device based on different classes of reporting rules, to satisfy communication requirements in different scenarios.

Based on the second aspect, in a possible design, the network side device includes a second device and a third device, where the first device is a terminal device, and the second device and the third device are a same access network device; or the first device is a terminal device, the second device is a relay device, and the third device is an access network device; or the first device is a terminal device, the second device is a first relay device, and the third device is a second relay device; or the first device is a first terminal device, the second device is an access network device, and the third device is a third terminal device; or the first device is a relay device, and the second device and the third device are a same access network device; or the first device is a first relay device, the second device is a second relay device, and the third device is an access network device.

The foregoing technical solution allows the technical solution in this embodiment of this application to be applied to different communication scenarios.

Based on the second aspect, in a possible design, the resource indicated by the first information and used by the first device to perform interference measurement includes at least one of a time domain resource, a frequency domain resource, and a code domain resource.

In the foregoing technical solution, a resource can be multiplexed, to help save an interference measurement resource.

Based on the second aspect, in a possible design, the reported value is a channel quality indicator (CQI), reference signal received power (RSRP), reference signal received quality (RSRQ), a received signal strength indicator (RSSI), or channel state information (CSI).

According to a third aspect, an embodiment of this application provides a reporting method. The method includes:

receiving, by a first device, first information sent by a second device, where the first information is used to indicate M interference measurement resources to the first device, $M \geq 2$, and M is a positive integer; and sending, by the first device, N reported values to a third device, where the reported values separately correspond to N of the M resources, the reported value is obtained based on an interference measurement result that is on the resource corresponding to the reported value, N is a positive integer, and $M \geq N \geq 2$; or sending, by the first device, K reported values to a third device, where the reported value is obtained based on interference measurement results that are on the at least two of the M resources, K is a positive integer, and $M \geq K \geq 1$.

The reported value may be obtained based on the interference measurement result that is on the resource corresponding to the reported value, or the reported value may be obtained based on the interference measurement result that is on the at least two of the M resources. Therefore, this helps improve interference measurement reporting flexibility.

Based on the third aspect, in a possible design, the reported value is a channel quality indicator (CQI), reference signal received power (RSRP), reference signal received quality (RSRQ), a received signal strength indicator (RSSI), or channel state information (CSI).

Based on the third aspect, in a possible design, the first device sends an identifier corresponding to the reported value to the third device, where the identifier is used to identify the resource.

The foregoing technical solution helps distinguish the interference status that is on the resource and that corresponds to the reported value.

Based on the third aspect, in a possible design, the first device receives second information sent by the second device, and sends the at least one reported value to the third device based on the second information, where the second information is used to indicate a reporting rule.

The foregoing technical solution ensures that the at least one reported value sent by the first device to the third device satisfy a requirement of the third device.

Based on the third aspect, in a possible design, the first device sends the at least one reported value to the third device according to a predefined reporting rule.

The foregoing technical solution ensures that the at least one reported value sent by the terminal device to the third device satisfy a requirement of the third device.

In addition, it should be noted that in this embodiment of this application, the first device may further determine, based on both the reporting rule indicated by the second information and the predefined reporting rule, that the at least one reported value needs to be sent to the third device, that is, the first device sends the at least one reported value to the third device according to the reporting rule indicated by the second information and the predefined reporting rule.

Based on the third aspect, in a possible design, the reporting rule indicated by the second information or the predefined reporting rule is used to indicate at least one of a quantity of reported values, the identifier corresponding to the reported value, and a threshold, and the threshold is used to select the reported value.

In the foregoing technical solution, the reporting rule may include different classes. For example, a first-class reporting rule may be used to indicate a quantity of reported values, a second-class reporting rule is used to indicate an identifier corresponding to the reported value, and a third-class reporting rule is used to indicate a threshold. Therefore, in different statuses, the first device can report a corresponding reported value to the third device based on different classes of reporting rules, to satisfy communication requirements in different scenarios.

Based on the third aspect, in a possible design, the first device is a terminal device, and the second device and the third device are a same access network device; or the first device is a terminal device, the second device is a relay device, and the third device is an access network device; or the first device is a terminal device, the second device is a first relay device, and the third device is a second relay device; or the first device is a first terminal device, the second device is an access network device, and the third device is a second terminal device; or the first device is a relay device, and the second device and the third device are a same access network device; or the first device is a first relay device, the second device is a second relay device, and the third device is an access network device.

The technical solution in this embodiment of this application can be applied to different communication scenarios.

According to a fourth aspect, an embodiment of this application further provides a report receiving method. The method includes:

sending, by a network side device, first information to a first device, where the first information is used to indicate M interference measurement resources to the first device, $M \geq 2$, and M is a positive integer; and receiving, by the network side device, N reported values sent by the first device, where the reported values separately correspond to N of the M resources, the reported value is obtained based on an interference measurement result that is on the resource corresponding to the reported value, N is a positive integer, and $M \geq N \geq 2$; or receiving, by the network side device, K reported values sent by the first device, where the reported value is obtained based on interference measurement results that are on the at least two of the M resources, K is a positive integer, and $M \geq K \geq 1$.

The reported value may be obtained based on the interference measurement result that is on the resource corresponding to the reported value, or the reported value may be obtained based on the interference measurement result that is on the at least two of the M resources. Therefore, this helps improve interference measurement reporting flexibility.

Based on the fourth aspect, in a possible design, the reported value is a channel quality indicator (CQI), reference signal received power (RSRP), reference signal received quality (RSRQ), a received signal strength indicator (RSSI), or channel state information (CSI).

Based on the fourth aspect, in a possible design, the network side device receives an identifier that corresponds to the reported value and that is sent by the first device, where the identifier is used to identify the resource.

The foregoing technical solution helps distinguish the interference status that is on the resource and that corresponds to the reported value.

Based on the fourth aspect, in a possible design, the network side device sends second information to the first device, where the second information is used to indicate a reporting rule.

The foregoing technical solution helps the at least one reported value sent by the first device to the network side device satisfy a requirement of the third device.

Based on the fourth aspect, in a possible design, the reporting rule is used to indicate at least one of a quantity of reported values, the identifier corresponding to the reported value, and a threshold, and the threshold is used to select the reported value.

In the foregoing technical solution, the reporting rule may include different classes. For example, a first-class reporting rule may be used to indicate a quantity of reported values, a second-class reporting rule is used to indicate an identifier corresponding to the reported value, and a third-class reporting rule is used to indicate a threshold. Therefore, in different statuses, the first device can report a corresponding reported value to the third device based on different classes of reporting rules, to satisfy communication requirements in different scenarios.

Based on the fourth aspect, in a possible design, the network side device includes a second device and a third device, where the first device is a terminal device, and the second device and the third device are a same access network device; or the first device is a terminal device, the second device is a relay device, and the third device is an access network device; or the first device is a terminal device, the second device is a first relay device, and the third device is a second relay device; or the first device is a first terminal device, the second device is an access network device, and the third device is a second terminal device; or the first device is a relay device, and the second device and the third device are a same access network device; or the first device is a first relay device, the second device is a second relay device, and the third device is an access network device.

The foregoing technical solution can be applied to different communication scenarios.

According to a fifth aspect, an embodiment of this application provides a first device, including: a processing module and a transceiver module, where the transceiver module is configured to receive first information sent by a second device and send at least one reported value to a third device, where the first information is used to indicate an interference measurement resource to the first device; and the reported value is obtained by the processing module based on an interference measurement result that is on a part of the resource.

Based on the fifth aspect, in a possible design, the resource indicated by the first information includes at least one of a time domain resource, a frequency domain resource, and a code domain resource.

Based on the fifth aspect, in a possible design, the transceiver module is further configured to send an identifier corresponding to the reported value to the third device, where the identifier is used to identify the part of the resource.

Based on the fifth aspect, in a possible design, the transceiver module is further configured to: receive second information sent by the second device, and send the at least one reported value to the third device based on the second information, where the second information is used to indicate a reporting rule.

Based on the fifth aspect, in a possible design, the transceiver module is configured to send the at least one reported value to the third device according to a predefined reporting rule.

Based on the fifth aspect, in a possible design, the reporting rule indicated by the second information or the predefined reporting rule is used to indicate at least one of a quantity of reported values, the identifier corresponding to the reported value, and a threshold, and the threshold is used to select the reported value.

Based on the fifth aspect, in a possible design, the reported value is a channel quality indicator (CQI), reference signal received power (RSRP), reference signal received quality (RSRQ), a received signal strength indicator (RSSI), or channel state information (CSI).

Based on the fifth aspect, in a possible design, the first device is a terminal device, and the second device and the third device are a same access network device; or the first device is a terminal device, the second device is a relay device, and the third device is an access network device; or the first device is a terminal device, the second device is a first relay device, and the third device is a second relay device; or the first device is a first terminal device, the second device is an access network device, and the third device is a second terminal device; or the first device is a relay device, and the second device and the third device are the same access network device; or the first device is a first relay device, the second device is a second relay device, and the third device is an access network device.

It should be noted that in the fifth aspect and other aspects, the processing module may correspond to a processor in a hardware device, and the transceiver module corresponds to a transceiver in a hardware module. It should also be noted that in some embodiments of the present disclosure, the term "module" may refer to a functional component of a piece of hardware with the function or functions implemented by software running on the hardware.

According to another aspect, an embodiment of this application further provides a first device, including a processor, a transceiver, and a memory. The memory is configured to store a program instruction and information received and sent by the transceiver, and the processor is configured to execute the program instruction stored by the memory, to implement the technical solution according to the first aspect or any one of the possible designs of the first aspect in the embodiments of this application.

According to still another aspect, an embodiment of this application further provides a computer storage medium, configured to store a program of the technical solution according to the first aspect or any one of the possible designs of the first aspect.

According to yet another aspect, an embodiment of this application provides a chip. The chip is coupled to a transceiver of a first device, and is configured to implement the technical solution according to the first aspect or any one of the possible designs of the first aspect in the embodiments of this application. It should be understood that "coupling" in the embodiments of this application is direct or indirect combination of two components. The combination may be fixed or mobile, and may allow communication of fluid, electricity, an electrical signal, or another type of signal between two components.

According to a sixth aspect, an embodiment of this application further provides a network side device, including: a processing module and a transceiver module, where the transceiver module is configured to: send first information to a first device, and receive at least one reported value sent by the first device, where the first information is used to indicate an interference measurement resource to the first device, and the reported value is obtained by the processor based on an interference measurement result that is on a part of the resource.

Based on the sixth aspect, in a possible design, the transceiver module is further configured to receive an identifier that corresponds to the reported value and that is sent by the first device, where the identifier is used to identify the part of the resource.

Based on the sixth aspect, in a possible design, the transceiver module is further configured to send second information to the first device, where the second information is used to indicate a reporting rule.

Based on the sixth aspect, in a possible design, the reporting rule is used to indicate at least one of a quantity of reported values, the identifier corresponding to the reported value, and a threshold, and the threshold is used to select the reported value.

Based on the sixth aspect, in a possible design, the network side device may include a second device and a third device, where the first device is a terminal device, and the second device and the third device are a same access network device; or the first device is a terminal device, the second device is a relay device, and the third device is an access network device; or the first device is a terminal device, the second device is a first relay device, and the third device is a second relay device; or the first device is a first terminal device, the second device is an access network device, and the third device is a second terminal device; or the first device is a relay device, and the second device and the third device are a same access network device; or the first device is a first relay device, the second device is a second relay device, and the third device is an access network device.

Based on the sixth aspect, in a possible design, the resource includes at least one of a time domain resource, a frequency domain resource, and a code domain resource.

Based on the sixth aspect, in a possible design, the reported value is a channel quality indicator (CQI), reference signal received power (RSRP), reference signal received quality (RSRQ), a received signal strength indicator (RSSI), or channel state information (CSI).

It should be noted that in the sixth aspect and any possible design of the sixth aspect, the processing module corresponds to a processor in a hardware device, and the transceiver module corresponds to a transceiver in a hardware module.

According to another aspect, an embodiment of this application further provides a network side device, including a processor, a transceiver, and a memory. The memory is configured to store a program instruction and information received and sent by the transceiver, and the processor is configured to execute the program instruction stored by the memory, to implement the technical solution according to the second aspect or any one of the possible designs of the second aspect in the embodiments of this application.

According to still another aspect, an embodiment of this application further provides a computer storage medium, configured to store a program of the technical solution according to the second aspect or any one of the possible designs of the second aspect.

According to yet another aspect, an embodiment of this application provides a chip. The chip is coupled to a transceiver of a network side device, and is configured to implement the technical solution according to the second aspect or any one of the possible designs of the second aspect in the embodiments of this application. It should be understood that "coupling" in the embodiments of this application is direct or indirect combination of two components. The combination may be fixed or mobile, and may allow communication of fluid, electricity, an electrical signal, or another type of signal between two components.

An embodiment of this application further provides a communications system, including the first device according to the fifth aspect and any one of the possible designs of the fifth aspect, and the network side device according to the sixth aspect and any one of the possible designs of the sixth aspect.

According to a seventh aspect, an embodiment of this application provides a first device, including: a processing module and a transceiver module, where the transceiver module is configured to receive first information sent by a second device, where the first information is used to indicate M interference measurement resources to the first device, $M \geq 2$, and M is a positive integer; and the transceiver module is configured to send N reported values to a third device, where the reported values separately correspond to N of the M resources, the reported value is obtained by the processor based on an interference measurement result that is on the resource corresponding to the reported value, N is a positive integer, and $M \geq N \geq 2$; or the transceiver module is configured to send K reported values to a third device, where the reported value is obtained based on interference measurement results that are on the at least two of the M resources, K is a positive integer, and $M \geq K \geq 1$.

Based on the seventh aspect, in a possible design, the reported value is a channel quality indicator (CQI), reference signal received power (RSRP), reference signal received quality (RSRQ), a received signal strength indicator (RSSI), or channel state information (CSI).

Based on the seventh aspect, in a possible design, the transceiver module is configured to send an identifier corresponding to the reported value to the third device, where the identifier is used to identify the resource.

Based on the seventh aspect, in a possible design, the transceiver module is configured to: receive second information sent by the second device, and send the at least one reported value to the third device based on the second information, where the second information is used to indicate a reporting rule.

Based on the seventh aspect, in a possible design, the transceiver module is configured to send the at least one reported value to the third device according to a predefined reporting rule.

Based on the seventh aspect, in a possible design, the reporting rule indicated by the second information or the predefined reporting rule is used to indicate at least one of a quantity of reported values, the identifier corresponding to the reported value, and a threshold, and the threshold is used to select the reported value.

Based on the seventh aspect, in a possible design, the first device is a terminal device, and the second device and the third device are a same access network device; or the first device is a terminal device, the second device is a relay device, and the third device is an access network device; or the first device is a terminal device, the second device is a first relay device, and the third device is a second relay device; or the first device is a first terminal device, the second device is an access network device, and the third device is a second terminal device; or the first device is a relay device, and the second device and the third device are a same access network device; or the first device is a first relay device, the second device is a second relay device, and the third device is an access network device.

It should be noted that in the seventh aspect and any possible design of the seventh aspect, the processing module corresponds to a processor in a hardware device, and the transceiver module corresponds to a transceiver in a hardware module.

According to another aspect, an embodiment of this application further provides a first device, including a processor, a transceiver, and a memory. The memory is configured to store a program instruction and information received and sent by the transceiver, and the processor is configured to execute the program instruction stored by the memory, to implement the technical solution according to the third aspect or any one of the possible designs of the third aspect in the embodiments of this application.

According to still another aspect, an embodiment of this application further provides a computer storage medium, configured to store a program of the technical solution according to the third aspect or any one of the possible designs of the third aspect.

According to yet another aspect, an embodiment of this application provides a chip. The chip is coupled to a transceiver of a network side device, and is configured to implement the technical solution according to the third aspect or any one of the possible designs of the third aspect in the embodiments of this application. It should be understood that "coupling" in the embodiments of this application is direct or indirect combination of two components. The combination may be fixed or mobile, and may allow communication of fluid, electricity, an electrical signal, or another type of signal between two components.

According to an eighth aspect, an embodiment of this application further provides a network side device, including: a processing module and a transceiver module, where the transceiver module is configured to send first information to a first device, where the first information is used to indicate M interference measurement resources to the first device, M≥2, and M is a positive integer; and the transceiver module is configured to receive N reported values sent by the first device, where the reported values separately correspond to N of the M resources, the reported value is obtained by the processor based on an interference measurement result that is on the resource corresponding to the reported value, N is a positive integer, and M≥N≥2; or the transceiver module is configured to receive K reported values sent by the first device, where the reported value is obtained by the processing module based on interference measurement results that are on the at least two of the M resources, K is a positive integer, and M≥K≥1.

Based on the eighth aspect, in a possible design, the reported value is a channel quality indicator (CQI), reference signal received power (RSRP), reference signal received quality (RSRQ), a received signal strength indicator (RSSI), or channel state information (CSI).

Based on the eighth aspect, in a possible design, the transceiver module is configured to receive an identifier that corresponds to the reported value and that is sent by the first device, where the identifier is used to identify the resource.

Based on the eighth aspect, in a possible design, the transceiver module is configured to send second information to the first device, where the second information is used to indicate a reporting rule.

Based on the eighth aspect, in a possible design, the reporting rule is used to indicate at least one of a quantity of reported values, the identifier corresponding to the reported value, and a threshold, and the threshold is used to select the reported value.

Based on the eighth aspect, in a possible design, the network side device includes a second device and a third device, where the first device is a terminal device, and the second device and the third device are a same access network device; or the first device is a terminal device, the second device is a relay device, and the third device is an access network device; or the first device is a terminal device, the second device is a first relay device, and the third device is a second relay device; or the first device is a first terminal device, the second device is an access network device, and the third device is a second terminal device; or the first device is a relay device, and the second device and the third device are a same access network device; or the first device is a first relay device, the second device is a second relay device, and the third device is an access network device.

It should be noted that in the eighth aspect and any possible design of the eighth aspect, the processing module corresponds to a processor in a hardware device, and the transceiver module corresponds to a transceiver in a hardware module.

According to another aspect, an embodiment of this application further provides a network side device, including a processor, a transceiver, and a memory. The memory is configured to store a program instruction and information received and sent by the transceiver, and the processor is configured to execute the program instruction stored by the memory, to implement the technical solution according to the fourth aspect or any one of the possible designs of the fourth aspect in the embodiments of this application.

According to still another aspect, an embodiment of this application further provides a computer storage medium, configured to store a program of the technical solution according to the fourth aspect or any one of the possible designs of the fourth aspect.

According to yet another aspect, an embodiment of this application provides a chip. The chip is coupled to a transceiver of a network side device, and is configured to implement the technical solution according to the fourth aspect or any one of the possible designs of the fourth aspect in the embodiments of this application. It should be understood that "coupling" in the embodiments of this application is direct or indirect combination of two components. The combination may be fixed or mobile, and may allow communication of fluid, electricity, an electrical signal, or another type of signal between two components.

An embodiment of this application further provides a communications system, including the first device according to the seventh aspect and any one of the possible designs of the seventh aspect, and the network side device according to the eighth aspect and any one of the possible designs of the eighth aspect.

DESCRIPTION OF EMBODIMENTS

The embodiments of this application are described in detail below with reference to the accompanying drawings of the specification.

Figure 2:
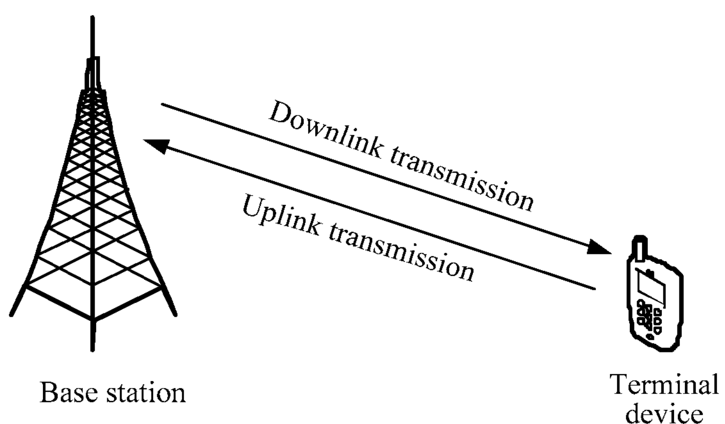
FIG. 2 is a schematic architectural diagram of a communications system.

It should be understood that, the embodiments of this application may be applied to, but not limited to, a communications system such as a long term evolution (LTE) system, a long term evolution-advanced (LTE-A) system, an enhanced long term evolution-advanced (eLTE) system, or a new radio (NR) system, or may be extended to wireless fidelity (WiFi), Worldwide Interoperability for Microwave Access (WIMAX), a related cellular system in 3rd Generation Partnership Project (3GPP), or the like. A specific architecture of the communications system to which the embodiments of this application are applied may be shown in FIG. 2, and includes a base station and a terminal device. It should be noted that the communications system to which the embodiments of this application are applied may further include a plurality of relay devices such as an RN.

It should be understood that a first device in the embodiments of this application may be a terminal device or may be a relay device. Specifically, the terminal device may be a device configured to provide voice and/or data connectivity to a user, a handheld device having a wireless connection function, or another processing device connected to a wireless modem. The terminal device may be a wireless terminal. The wireless terminal may communicate with one or more core networks by using a radio access network (RAN). The wireless terminal may be a mobile terminal, such as a mobile phone (also referred to as a "cellular" phone) or a computer with a mobile terminal. For example, the computer with a mobile terminal may be a portable, pocket-sized, handheld, computer built-in, or in-vehicle mobile apparatus, which exchanges voice and/or data with the radio access network. For example, the wireless terminal may alternatively be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit (Subscriber Unit), a subscriber station (Subscriber Station), a mobile station (Mobile Station), a mobile (Mobile), a remote station (Remote Station), an access point (AP), a remote terminal (Remote Terminal), an access terminal (Access Terminal), a user terminal (User Terminal), a user agent (User Agent), a user device (User Device), or UE. The embodiments of this application are not limited thereto.

A second device in the embodiments of this application may be a relay device or may be an access network device. When the second device is an access network device, the second device may be base stations (for example, a macro base station and a micro base station (also referred to as a small cell)) in various forms, a relay station, an access point, or the like, or may be a device communicating with a wireless terminal on an air interface by using one or more sectors in an access network. When the access network device is a base station, the base station may be configured to perform conversion between a received over-the-air frame and an Internet Protocol (IP) packet, and serves as a router between a wireless terminal and the remaining part of an access network, where the remaining part of the access network may include an IP network. The base station may further be configured to coordinate attribute management on an air interface. In communications systems using different wireless access technologies, names of devices having a base station function may be different. For example, a base station in a global system for mobile communications (GSM) or code division multiple access (CDMA) system is referred to as a base transceiver station (BTS), a base station in wideband code division multiple access (WCDMA) is referred to as a node B (node B), a base station in an LTE system is referred to as an evolved node B (eNB), and a base station in an NR system is referred to as gNB. This is not limited in the embodiments of this application.

A relay device in the embodiments of this application may be another device having a relay function such as a repeater, a terminal device, or a base station. This is not limited in the embodiments of this application. A hub is a special repeater.

It should be understood that the first device in the embodiments of this application may be a terminal device or a relay device, the second device is an access network device or a relay device, and the third device may be an access network device or may be a relay device or a terminal device. It should be noted that when the second device is an access network device and the third device is an access network device, the second device and the third device are a same access network device or may be different access network devices, when the second device is a relay device and the third device is a relay device, the second device and the third device may be a same relay device or may be different relay devices, and when the first device is a terminal device and the third device is a terminal device, the first device and the third device are different terminal devices. The foregoing describes only some examples, and the first device, the second device, and the third device are not limited in the present invention and may depend on a specific application scenario.

Figure 1A:
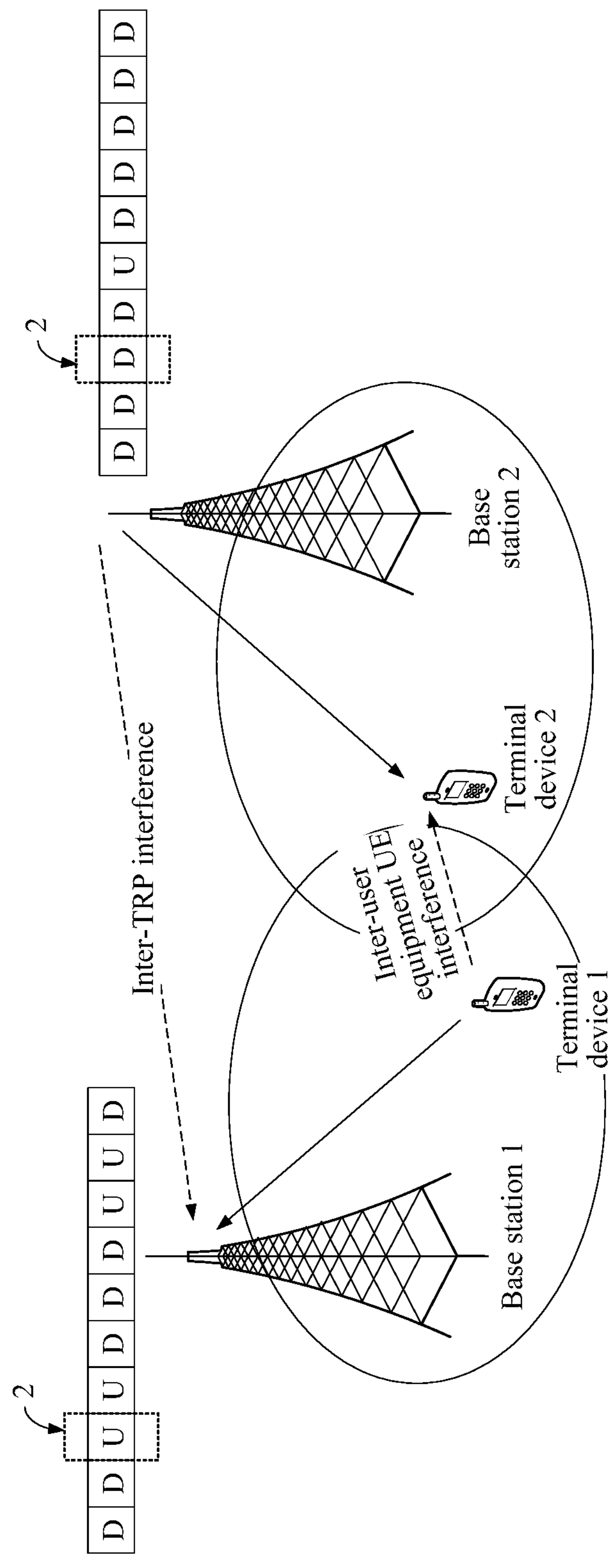
FIG. 1*a* and FIG. 1*b* are schematic diagrams of communications system architectures.

Optionally, in a communications system architecture shown in FIG. 1*a*, during measurement of inter-UE interference, when an access network device is close to a terminal device, a relay device is not required to forward information. In this scenario, the first device is a terminal device, and the second device and the third device are a same access network device. When the access network device is far from the terminal device and a device having a relay function is required to forward information, the first device is a terminal device, the second device is a relay device, and the third device is an access network device. Alternatively, the first device is a terminal device, the second device is a first relay device, and the third device is a second relay device. It should be noted that in this case, the first relay device and the second relay device may be a same relay device or may be different relay devices. In addition, in a communications system architecture shown in FIG. 1*b*, during measurement of RN-RN interference, the first device is a relay device and the second device and the third device are a same access network device; or the first device is a first relay device, the second device is a second relay device, the third device is an access network device, and the first relay device and the second relay device are different relay devices; or the first device is a first relay device, the second device is a second relay device, and the third device is a third relay device. In this case, the first relay device is different from the second relay device and the third relay device, and the second relay device and the third relay device may be the same or may be different. In addition, the embodiments of this application may further be applied to a device to device (device to device, D2D) scenario to measure inter-UE interference. In this scenario, the first device is a first terminal device, the second device is an access network device, the third device is a second terminal device, and the first terminal device and the third terminal device are different terminal devices. The foregoing describes only some examples, and the first device, the second device, and the third device are not limited in the present invention and may depend on a specific application scenario.

In the embodiments of this application, a relay device and an access network device are collectively referred to as a network side device, and a relay device is a device having a relay function.

An example in which when the first device is a terminal device and the second device and the third device are a same base station, inter-UE interference is measured in the communications system architecture shown in FIG. 1*a* is used, to describe the embodiments of this application in detail. Cases in which the embodiments of this application are applied to another scenario to measure other cross interference such as inter-UE interference, inter-TRP interference, and RN-RN interference are similar to this, and details are not described one by one herein again.

It should be understood that in the embodiments of this application, an interference measurement resource of the first device may be a zero power (ZP) CSI-RS resource, or may be a non-zero power (NZP) CSI-RS resource, or may be a ZP or NZP demodulation reference signal (DMRS) resource, a ZP or NZP sounding reference signal (SRS) resource, a ZP data resource, a ZP or NZP phase tracking reference signal (PTRS) resource, or may be other ZP or NZP reference signal (RS) resources, or other ZP or NZP resources, or the like. This is not limited in the embodiments of this application.

Embodiment 1

The following uses an example in which a first device is a terminal device and a second device and a third device are base stations to describe the technical solutions of this application in detail.

Figure 3:
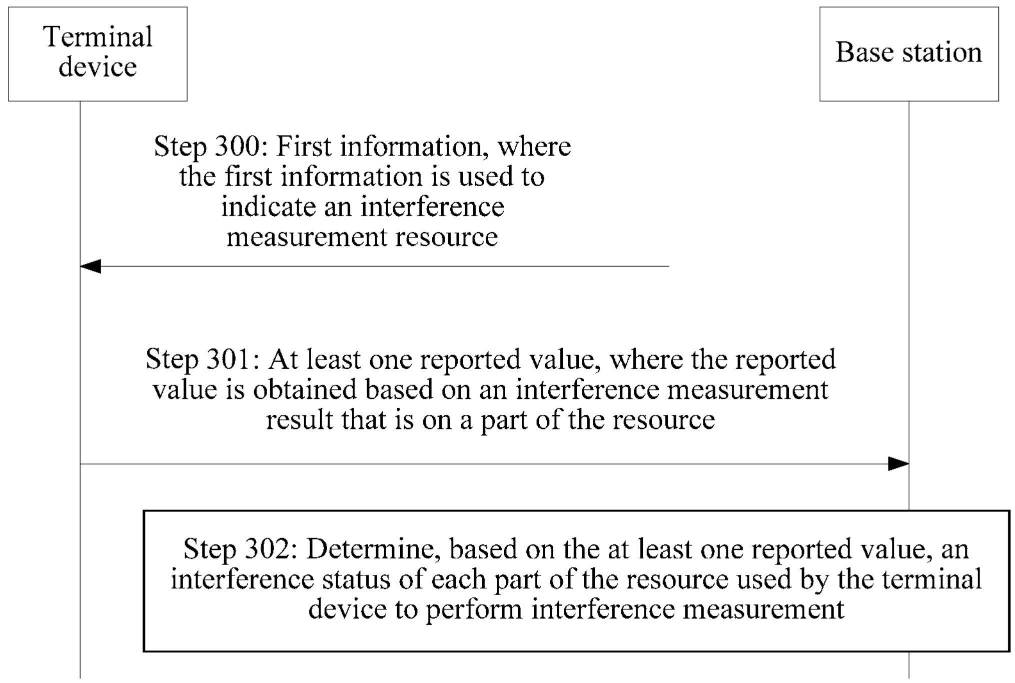
FIG. 3 is a schematic flowchart of a reporting method according to an embodiment of this application.

As shown in FIG. 3, an interference measurement method in this embodiment of this application includes:

Step 300: A base station sends first information to a terminal device, where the first information is used to indicate an interference measurement resource to the terminal device.

Step 301: After receiving the first information sent by the base station, the terminal device sends at least one reported value to the base station, where the reported value is obtained based on an interference measurement result that is on a part of the resource.

Step 302: After receiving the at least one reported value, the base station determines, based on the at least one reported value, an interference status of each part of the resource used by the terminal device to perform interference measurement.

It should be noted that in the embodiments of this application, the terminal device in step 300 to step 302 is a receive-end terminal device, and the base station in step 300 to step 302 is a receive-end base station. Specifically, the receive-end terminal device is a terminal device that receives an interference measurement signal, performs interference measurement, and sends the reported value; and the receive-end base station is a base station that is used to allocate an interference measurement resource to the terminal device and receive the reported value.

In addition, correspondingly, there are further the following related concepts: a transmit-end terminal device is a terminal device used to send an interference measurement signal; and a transmit-end base station is used to indicate a signal used as an interference measurement signal to the transmit-end terminal device. FIG. 1*a* is used as an example. The terminal device 2 is a receive-end terminal device, the base station 2 is a receive-end base station, the terminal device 1 is a transmit-end terminal device, and the base station 1 is a transmit-end base station. FIG. 1*a* shows only one transmit-end terminal device and one transmit-end base station. In an application scenario of the embodiments of this application, there may be a plurality of transmit-end terminal devices or a plurality of transmit-end base stations, and this is not limited.

The following uses the receive-end base station, the receive-end terminal device, the transmit-end base station, and the transmit-end terminal device to describe the embodiments of this application in detail.

It should further be noted that in the embodiments of this application, the part of the resource is a resource used to receive an interference measurement signal, and the interference measurement result is obtained by the receive-end terminal device by performing interference measurement based on an interference measurement signal received on the part of the resource. FIG. 1*a* is used as an example. It is assumed that an interference measurement signal 1 is sent by the terminal device 1, the terminal device 2 receives the interference measurement signal 1 on a part of the resource 1, performs interference measurement to obtain an interference measurement result 1, and finally obtains a reported value 1 based on the interference measurement result 1. In this case, the reported value 1 may be used to indicate a status of interference caused by the terminal device 1 to the terminal device 2.

Optionally, in the embodiments of this application, the reported value may be a reference signal received power (RSRP), or the reported value may be a received signal strength indicator (RSSI), or the reported value may be reference signal received quality (RSRQ), or the reported value may be a channel quality indicator (CQI), or the reported value may be channel state information (CSI), or the like. This is not limited in the embodiments of this application.

Optionally, in this embodiment of this application, the reported value may be used to indicate a status of interference caused by the transmit-end terminal device to the receive-end terminal device on the part of the resource. The reported value may be an interference measurement result or a value calculated based on an interference measurement result. For example, a CQI reported in LTE-A is calculated based on an interference measurement result. In this embodiment of this application, a manner of obtaining the reported value based on the interference measurement result is not specifically limited. Therefore, in this embodiment of this application, when interference measurement signals sent by a plurality of transmit-end terminal devices are received on the resource used by the receive-end terminal device to perform interference measurement, interference measurement can be performed on a part that is of the resource used by the receive-end terminal device to perform interference measurement and that is used to receive each interference measurement signal, to obtain a plurality of interference measurement results, and a reported value obtained based on the interference measurement results can be sent to the receive-end base station, so that the receive-end base station can determine a status of interference caused by each of the plurality of transmit-end terminal devices to the receive-end terminal device, to help reduce possibility of failed data transmission in a communication process.

In this embodiment of this application, the resource used by the receive-end terminal device to perform interference measurement may correspond to one or more reported values. Therefore, in step 301, the receive-end terminal device may specifically send the at least one reported value to the receive-end base station according to a predefined reporting rule, or a reporting rule indicated by second information sent by the receive-end base station to the receive-end terminal device, or a predefined reporting rule and a reporting rule indicated by second information sent by the receive-end base station to the receive-end terminal device.

For example, the predefined reporting rule or the reporting rule indicated by the second information is used to indicate a quantity of reported values. When the quantity of reported values is equal to a total quantity of reported values obtained by performing interference measurement on the resource used by the receive-end terminal device to perform interference measurement, the receive-end terminal device reports all values obtained through interference measurement to the receive-end base station. In addition, the predefined reporting rule or the reporting rule indicated by the second information may further indicate that a quantity of reported values is less than all values obtained by a receive-end terminal device by performing interference measurement on the interference measurement resource, and the receive-end terminal device reports, to a receive-end base station, the quantity of reported values indicated by the predefined reporting rule or the reporting rule indicated by the second information.

In this embodiment of this application, optionally, the receive-end terminal device further sends an identifier corresponding to the reported value to the receive-end base station, so that the receive-end base station can learn of an interference measurement result that corresponds to each reported value and that is on a part of the interference measurement resource. The identifier is used to identify the part of the resource.

It should be noted that when the predefined reporting rule or the reporting rule indicated by the second information is used to indicate that the quantity of reported values is equal to a total quantity of reported values obtained by the receive-end terminal device by performing interference measurement on the interference measurement resource, during a specific implementation, the identifier corresponding to the reported value may alternatively not be sent to the receive-end base station, and a reporting sequence of reported values corresponding to various parts of the resource is agreed on in advance, so that the receive-end base station can determine, based on the reporting sequence, an interference status on a part of the resource that is indicated by a reported value. The quantity of reported values indicated by the predefined reporting rule or the reporting rule indicated by the second information may be alternatively less than the total quantity of reported values obtained by the receive-end terminal device by performing interference measurement on the interference measurement resource, and a reporting manner thereof is similar to that of reporting, by the receive-end terminal device, all the reported values obtained through interference measurement to the receive-end base station. Details are not described one by one herein again.

The following uses an example in which a resource used by the receive-end terminal device to perform interference measurement is a ZP CSI-RS resource to describe, in detail, how to configure an identifier corresponding to a part of the resource. When the resource used by the receive-end terminal device to perform interference measurement is another resource, how to configure an identifier corresponding to a part of the resource is similar to this. Details are not described one by one herein again.

In this embodiment of this application, the resource used by the receive-end terminal device to perform in interference measurement may be one CSI-RS resource or may be a plurality of CSI-RS resources. This is not limited. However, each CSI-RS resource includes one or more CSI-RS resource element structure (component CSI-RS RE pattern), and a component CSI-RS RE pattern is (Y, Z), where Y is a quantity of continuous resource elements (RE) in frequency domain, and Z is a quantity of continuous REs in time domain. Candidate (Y, Z) includes (1, 2), (2, 1), (4, 1), (8, 1), (2, 2), (2, 4), and the like.

Figure 4A:
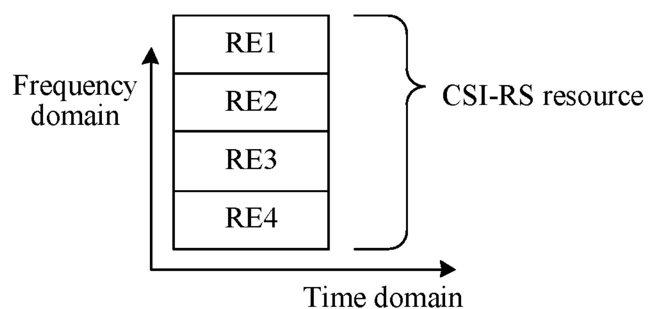
FIG. 4*a* to FIG. 4*c* are schematic diagrams of a CSI-RS resource according to an embodiment of this application.
Figure 4B:
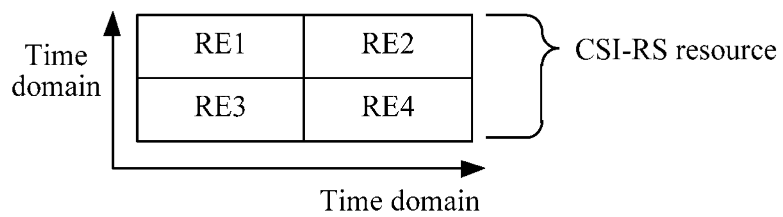

In an example, when a CSI-RS resource includes a component CSI-RS RE pattern (4, 1), as shown in FIG. 4*a*, the CSI-RS resource includes 4 REs: an RE1, an RE2, an RE3, and an RE4. When a CSI-RS resource includes a component CSI-RS RE pattern (2, 2), as shown in FIG. 4*b*, the CSI-RS resource includes 4 REs: an RE1, an RE2, an RE3, and an RE4. In this embodiment of this application, a resource that is indicated by the first information and that is used by the receive-end terminal device to perform interference measurement is a resource configured by the receive-end base station for the receive-end terminal device to perform interference measurement. FIG. 4*a* is used as an example. The receive-end base station may configure one or more CSI-RS resources shown in FIG. 4*a* for the receive-end terminal device, to perform interference measurement. For example, when the resource that is indicated by the first information and that is used by the receive-end terminal device to perform interference measurement is a CSI-RS resource shown in FIG. 4*a*, the part of the resource may be one or more REs of the CSI-RS resource. In an example, if a resource that an interference measurement signal sent by a transmit-end terminal device needs to occupy is one RE of the CSI-RS resource, the part of the resource is one RE. If the resource that the interference measurement signal sent by the transmit-end terminal device needs to occupy is two REs of the CSI-RS resource, the part of the resource is two REs. This is not limited in this embodiment of this application.

Figure 4C:
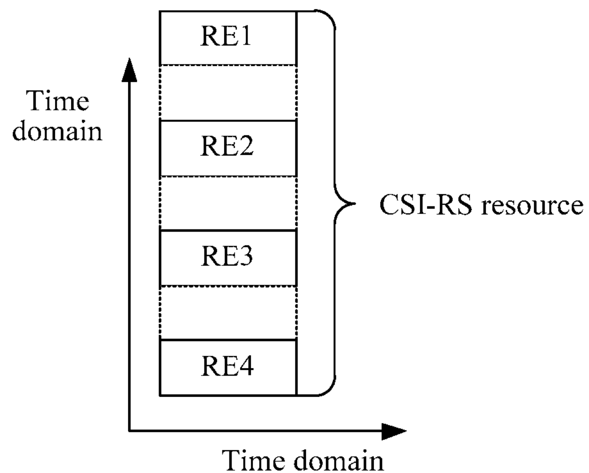

In addition, a CSI-RS resource may further be of a comb pattern. Assuming that a CSI-RS resource includes 4 REs: an RE1, an RE2, an RE3, and an RE4. The pattern of the CSI-RS resource thereof may be shown in FIG. 4*c*. Each two neighboring REs are spaced by an RE, the RE1 and the RE2 are two neighboring REs of the comb-pattern CSI-RS resource. Similarly, the RE2 and the RE3 are two neighboring REs of the comb-pattern CSI-RS resource, and the RE3 and the RE4 are two neighboring REs. It should be noted that when a CSI-RS resource is of a comb pattern, intervals between two neighboring REs of the CSI-RS resource may be the same or different. This is not limited in this embodiment of this application. In this case, it is assumed that the resource that is indicated by the first information and that is used by the receive-end terminal device to perform interference measurement is a CSI-RS resource shown in FIG. 4*c*, if an interference measurement signal sent by the transmit-end terminal device is a comb SRS, when a pattern (pattern) of a resource configured by the transmit-end base station for the transmit-end terminal device to send a comb SRS is the same as that of the CSI-RS resource, the part of the resource is the CSI-RS resource, and the receive-end terminal device receives, on the CSI-RS resource, the comb SRS sent by the transmit-end terminal device. To be specific, when a pattern of the resource indicated by the first information includes a plurality of patterns of the resource configured by the transmit-end base station for the transmit-end terminal device to send an interference measurement signal, the part of the resource is a resource that is used to receive the interference measurement signal and that is of the resource indicated by the first information.

It should further be noted that the resource that is indicated by the first information and that is used by the receive-end terminal device to perform interference measurement may be continuous or discontinuous in time domain or frequency domain. This is not limited in this embodiment of this application.

Figure 5:
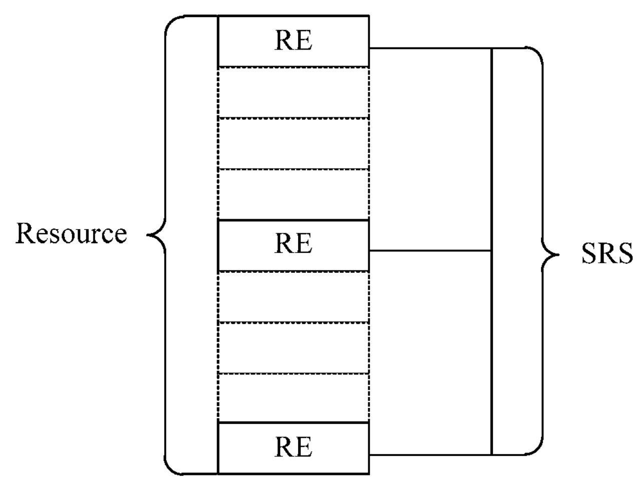
FIG. 5 is a schematic diagram of another CSI-RS resource according to an embodiment of this application.

Because an SRS may be used for uplink channel measurement in LTE-A, when inter-UE interference is measured, the SRS may be used as an interference measurement signal. The SRS is of a comb (comb) pattern, and a comb subcarrier spacing may be 2 subcarriers or 4 subcarriers. When a comb subcarrier spacing of the SRS is 4 subcarriers and includes two combs, a pattern of a resource matching the SRS may be shown in FIG. 5. Therefore, the resource matching the SRS is discontinuous in time and frequency domains. However, because a CSI-RS resource is formed by a component CSI-RS RE pattern and the CSI-RS resource formed by an existing component CSI-RS RE pattern is continuous in time and frequency domains, the SRS does not match the CSI-RS resource. When SRS and CSI-RS resources are used to measure inter-UE interference, the scenario shown in FIG. 1*a* is used as an example, the base station 2 configures an SRS for the terminal device 2 as an interference measurement signal, and the base station 1 configure a CSI-RS resource (ZP and/or NZP) for the terminal device 1 as an interference measurement resource to measure interference. Because SRS and CSI-RS resources are not matched, the terminal device 1 receives a plurality of comb-pattern SRSs on the CSI-RS resource, where the plurality of comb-pattern SRSs may correspond to a plurality of interference measurement signals sent by the transmit-end terminal device (for example, the terminal device 2). If interference measurement results corresponding to all transmit-end terminal devices on a configuration resource are filtered based on an existing interference measurement method in LTE-A, and the filtered interference measurement results are reported, interference caused by a single transmit-end terminal device (for example, the terminal device 2) to the receive-end terminal device (for example, the terminal device 1) cannot be accurately measured. Therefore, in this embodiment of this application, to enable the receive-end base station to know single inter-UE interference, when a CSI-RS resource corresponds to a plurality of interference measurement results, the reported value is determined based on each interference measurement result. The receive-end terminal device sends one or more reported values to the receive-end base station. The reported value is used to indicate the interference measurement result that is on the part of the resource, the part of the resource is a comb resource of the CSI-RS resource, and the comb resource may be used to receive a measurement signal sent by a transmit end on a comb SRS resource. Therefore, in this embodiment of this application, optionally, the receive-end terminal device further sends an identifier corresponding to the reported value to the receive-end base station, so that the receive-end base station can distinguish an interference measurement result that corresponds to a reported value and that is on a part of the CSI-RS resource. The identifier is used to identify the part of the resource.

Further, for class B measurement, the receive-end base station may configure a plurality of CSI-RS resources for the receive-end terminal device. Therefore, in a reporting process, to identify a CSI-RS resource corresponding to the reported value, a CSI-RS resource indicator (CRI) is used to identify the CSI-RS resource. Therefore, in this embodiment of this application, a CRI may be used to indicate a CSI-RS resource. Optionally, in this embodiment of this application, the identifier may be referred to as a CRI or may be other names, has a function for identifying a resource, and is a resource index (index), for example, may correspond to a port index (port index). The following uses a CRI as an example to provide detailed descriptions.

Figure 6:
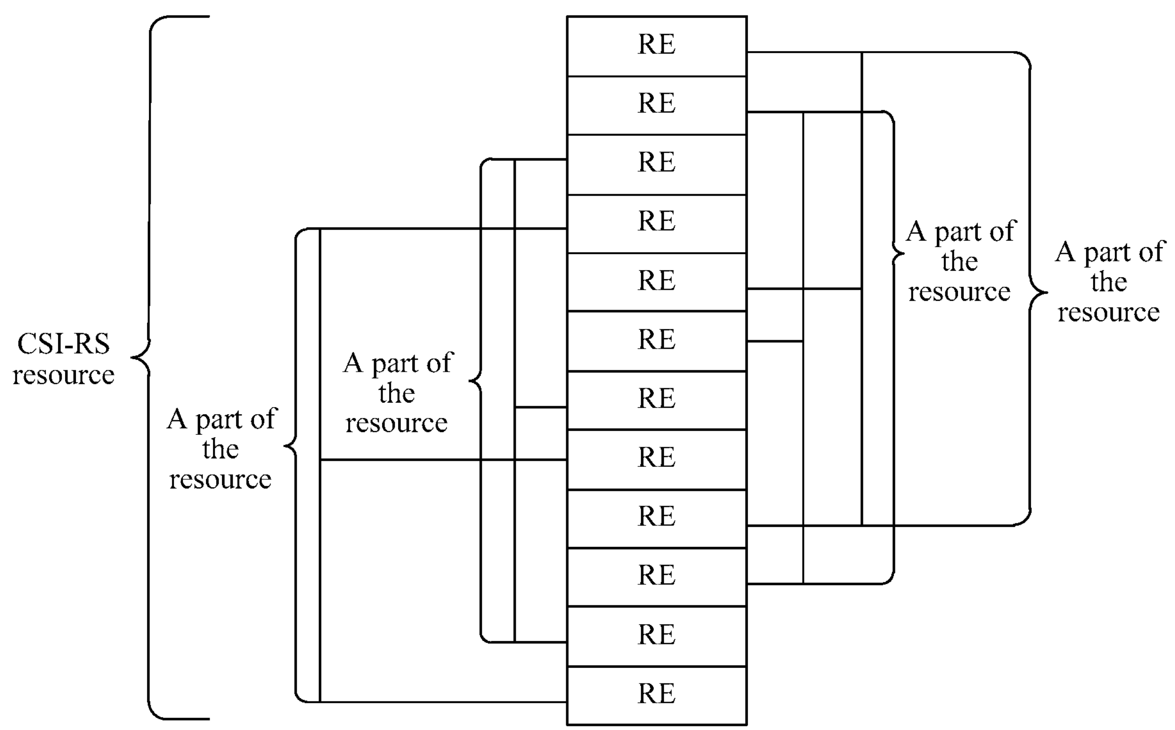
FIG. 6 is a schematic diagram of another CSI-RS resource according to an embodiment of this application.

In an example, assuming that the first information is used to indicate that the interference measurement resource of the terminal device includes one or more CSI-RS resources, as shown in FIG. 6, a CSI-RS resource is formed by 3 component CSI-RS RE patterns (4, 1) that are continuous in frequency domain. In an actual communications system, a CSI-RS resource may be on a plurality of resource blocks (resource block, RB) in frequency domain and a plurality of symbols in time domain. For ease of description, in this embodiment of this application, FIG. 6 shows only a CSI-RS resource on one symbol in one RB. It is assumed that during interference measurement, the transmit-end base station configures an SRS having a sending comb subcarrier spacing of 4 for the transmit-end terminal device as an interference measurement signal. In this case, the receive-end terminal device can receive 4 SRSs at most on the CSI-RS resource, the 4 SRSs are interference measurement signals of at least one transmit-end terminal device, and there are 4 transmit-end terminal devices at most in this case. It may be considered that a resource used by the receive-end terminal to receive an SRS is a part of the resource. To enable the receive-end base station to accurately obtain a single inter-UE interference measurement result or to enable the receive-end base station to obtain an interference measurement result corresponding to a comb resource that is used to receive an SRS and that is of the CSI-RS resource, the receive-end terminal device needs to send, to the receive-end base station, the reported value obtained based on the interference measurement result corresponding to the comb resource of the CSI-RS resource. That is, the receive-end terminal device needs to send 4 reported values to the receive-end base station. Optionally, when the receive-end terminal device sends a plurality of reported values to the receive-end base station, to enable the receive-end base station to determine parts of the resource separately corresponding to the reported values, the receive-end terminal device may report identifiers corresponding to the parts of the resource to the receive-end base station for distinguishing. Because in LTE-A, one CSI-RS resource is identified by one CRI, and one CSI-RS resource may correspond to a plurality of reported values in this scenario, each reported value also requires a corresponding identifier.

In this case, this embodiment of this application provides two methods.

Figure 7:
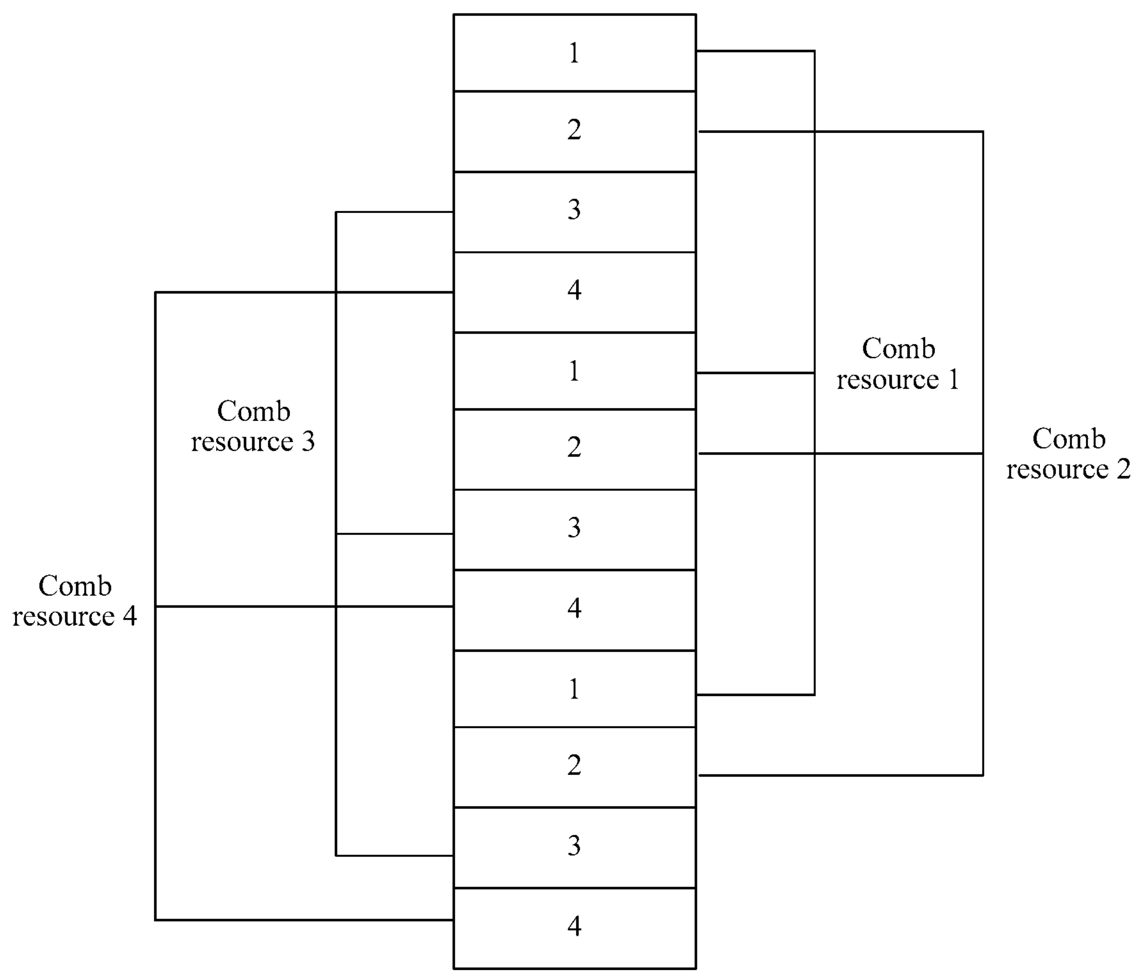
FIG. 7 is a schematic diagram of still another CSI-RS resource according to an embodiment of this application.

Method 1: An identifier corresponding to a reported value includes first partial information and second partial information, the first partial information is used to identify a CSI-RS resource, the second partial information is used to identify a part of the CSI-RS resource, and the reported value is obtained based on an interference measurement result that is on the part of the resource. It should be noted that a specific name of the identifier is not limited in this embodiment of this application. In an example, the first partial information used to identify a CSI-RS resource may be referred to as a CRI, and the second partial information used to identify a part of the CSI-RS resource may be referred to as a sub-CRI (sub-CRI). Specifically, when the resource that is indicated by the first information and that is used by the receive-end terminal device to perform interference measurement includes a plurality of CSI-RS resources, to distinguish different CSI-RS resources, different CRIs may be used to correspond to different CSI-RS resources. To distinguish different parts of a CSI-RS resource, different sub-CRIs may be used to correspond to different parts of the resource, and sub-CRIs corresponding to parts of different CRS-RS resources may be the same or different. A CSI-RS resource shown in FIG. 7 is used as an example. It is assumed that the receive-end terminal device needs to send 4 reported values to the receive-end base station. On the CSI-RS resource, a comb resource 1 corresponds to a reported value 1, a comb resource 2 corresponds to a reported value 2, a comb resource 3 corresponds to a reported value 3, and a comb resource 4 corresponds to a reported value 4. If a CRI1 is used to identify the CSI-RS resource, a sub-CRI1 is used to identify the comb resource 1, a sub-CRI2 is used to identify the comb resource 2, a sub-CRI3 is used to identify the comb resource 3, and a sub-CRI4 is used to identify the comb resource 4, the receive-end terminal device further correspondingly sends the identifiers (CRI1 and sub-CRI1) corresponding to the reported value 1, the identifiers (CRI1 and sub-CRI2) corresponding to the reported value 2, the identifiers (CRI1 and sub-CRI3) corresponding to the reported value 3, and the identifiers (CRI1 and sub-CRI4) corresponding to the reported value 4 to the receive-end base station.

Method 2: An identifier corresponding to a reported value includes one identifier, and the identifier is used to identify a part of a CSI-RS resource. Specifically, the identifier may be named as a CRI, but a specific name of the identifier is not limited in this embodiment of this application. A CRI is used as an example. When the interference measurement resource of the terminal device that is indicated by the first information includes a plurality of CSI-RS resources, to distinguish parts of different CSI-RS resources, different CRIs may be used to identify different parts of the resource. Specifically, CRIs used to identify parts of the same CSI-RS resource are different, and CRIs used to identify parts of different CSI-RS resources are also different. A CSI-RS resource shown in FIG. 7 is used as an example. It is assumed that the receive-end terminal device needs to send 4 reported values to the receive-end base station. On the CSI-RS resource, a comb resource 1 corresponds to a reported value 1, a comb resource 2 corresponds to a reported value 2, a comb resource 3 corresponds to a reported value 3, and a comb resource 4 corresponds to a reported value 4. If a CRI1 is used to identify the comb resource 1 of the CSI-RS resource, a CR12 is used to identify the comb resource 2 of the CSI-RS resource, a CR13 is used to identify the comb resource 3 of the CSI-RS resource, a CR14 is used to identify the comb resource 4 of the CSI-RS resource, and a sub-CRI4 is used to identify the comb resource 4, the receive-end terminal device further correspondingly sends the identifiers (CRI1) corresponding to the reported value 1, the identifiers (CR12) corresponding to the reported value 2, the identifiers (CR13) corresponding to the reported value 3, and the identifiers (CR14) corresponding to the reported value 4 to the receive-end base station.

The foregoing embodiment mainly describes a case in which the transmit-end base station configures, on one comb resource, that only one transmit-end terminal device sends an interference measurement signal. In a specific implementation, to save the interference measurement resource of the terminal device, the transmit-end base station may configure that a plurality of transmit-end terminal devices send an interference measurement signal (for example, an SRS) on a same resource. In this case, interference measurement signals sent by different transmit-end terminal devices are usually orthogonal or quasi-orthogonal signals. For example, signal sequences of SRSs sent by two transmit-end terminal devices use different cyclic shifts. The SRSs of the two transmit-end terminal devices may be considered as orthogonal signals, or different orthogonal cover codes are also orthogonal signals. Therefore, different transmit-end terminal devices may send different SRSs or orthogonal cover codes to implement multiplexing on a code domain resource. In this case, each of 4 comb resources of a CSI-RS resource shown in FIG. 7 may correspond to interference measurement signals of a plurality of terminal devices. If the base station needs to know an interference status generated by different transmit-end terminal devices on a same comb resource, the comb resource may need to correspond to a plurality of reported values. In the prior art, interference measurement resources are mainly distinguished in time domain and frequency domain. The foregoing case is equivalent to that space domain or code domain resources of a same time frequency resource are also considered as different resources, and are identified by using corresponding resource identifiers. Therefore, the resource used by the receive-end terminal device to perform interference measurement includes at least one of a time domain resource, a frequency domain resource, and a code domain resource. The code domain resource may include an orthogonal cover code (OCC), a cyclic shift (cyclic shift), or other code resources.

To distinguish, by using resource identifiers, a plurality of reported values corresponding to a same comb resource, specifically, this embodiment of this application provides 3 methods:

Method 1: An identifier corresponding to a reported value includes first partial information, second partial information, and third partial information, the first partial information is used to identify a CSI-RS resource, the second partial information is used to identify a comb resource of the CSI-RS resource, and the third partial information is used to identify a part that is of the comb resource and that is used to receive the interference measurement signal. It should be noted that in this embodiment of this application, a name of the identifier corresponding to the reported value is not limited. In an example, it is assumed that the first partial information used to identify a CSI-RS resource is named as a CRI, the second partial information used to identify a comb resource is named as a sub-CRI, and the third partial information used to identify a part that is of a comb resource and that is used to receive an interference measurement signal is named as a sub-sub-CRI. In this case, when the interference measurement resource of the terminal device that is indicated by the first information includes a plurality of CSI-RS resources, to distinguish different CSI-RS resources, different CRIs may be used to correspond to different CSI-RS resources, to distinguish different comb resources of a CSI-RS resource, different sub-CRIs may be used to correspond to different comb resources, to distinguish different parts of a comb resource, different sub-sub-CRIs may be used to correspond to different parts of the resource. Sub-CRIs corresponding to comb resources of different CRS-RS resources may be the same or different; and sub-sub-CRIs corresponding to parts of different comb resources may be the same or different. The CSI-RS resource shown in FIG. 7 is used as an example. Assuming that when each comb resource corresponds to two interference measurement signals, a resource used to receive an interference measurement signal is a part of the resource, the CSI-RS resource shown in FIG. 7 corresponds to 8 reported values at most. If the terminal device needs to send 8 reported values to the base station, on the CSI-RS resource, a part of the resource 1 corresponds to a reported value 1, a part of the resource 2 corresponds to a reported value 2, a part of the resource 3 corresponds to a reported value 3, a part of the resource 4 corresponds to a reported value 4, a part of the resource 5 corresponds to a reported value 5, a part of the resource 6 corresponds to a reported value 6, a part of the resource 7 corresponds to a reported value 7, and a part of the resource 8 corresponds to a reported value 8. A comb resource 1 of the CSI-RS resource includes the part of the resource 1 and the part of the resource 2, a comb resource 2 of the CSI-RS resource includes the part of the resource 3 and the part of the resource 4, a comb resource 3 of the CSI-RS resource includes the part of the resource 5 and the part of the resource 6, and a comb resource 4 of the CSI-RS resource includes the part of the resource 7 and the part of the resource 8. If CRI1 is used to identify the CSI-RS resource, sub-CRI1 is used to identify the comb resource 1, sub-CRI2 is used to identify the comb resource 2, sub-CRI3 is used to identify the comb resource 3, sub-CRI4 is used to identify the comb resource 4, sub-sub-CRI1 is used to identify the part of the resource 1, sub-sub-CR12 is used to identify the part of the resource 2, sub-sub-CRI3 is used to identify the part of the resource 3, sub-sub-CRI4 is used to identify the part of the resource 4, sub-sub-CRI5 is used to identify the part of the resource 5, sub-sub-CRI6 is used to identify the part of the resource 6, sub-sub-CRI7 is used to identify the part of the resource 7, and sub-sub-CRI8 is used to identify the part of the resource 8, the terminal device further correspondingly sends, to the base station, the identifiers (CRI1, sub-CRI1, and sub-sub-CRI1) corresponding to the reported value 1, the identifiers (CRI1, sub-CRI2, and sub-sub-CRI2) corresponding to the reported value 2, the identifiers (CRI1, sub-CRI3, and sub-sub-CRI3) corresponding to the reported value 3, and the identifiers (CRI1, sub-CRI4, and sub-sub-CRI4) corresponding to the reported value 4, and by analogy, identifiers separately corresponding to the reported value 5, the reported value 6, the reported value 7, and the reported value 8. In addition, when FIG. 7 is used as an example, and CRI1 is used to identify a CSI-RS resource, sub-CRI1 is used to identify the comb resource 1, sub-CRI2 is used to identify the comb resource 2, sub-CRI3 is used to identify the comb resource 3, and sub-CRI4 is used to identify the comb resource 4, the part of the resource 1, the part of the resource 3, the part of the resource 5, and the part of the resource 6 may be separately identified by sub-sub-CRI1, and the part of the resource 2, the part of the resource 4, the part of the resource 6, and the part of the resource 8 may be separately identified by sub-sub-CRI2. In this case, the reported value 1 corresponds to the identifiers (CRI1, sub-CRI1, and sub-sub-CRI1), the reported value 3 corresponds to the identifiers (CRI1, sub-CRI4, and sub-sub-CRI1), and by analogy, identifiers separately corresponding to the reported value 2, the reported value 4, the reported value 5, the reported value 6, the reported value 7, and the reported value 8 are obtained.

Method 2: An identifier corresponding to a reported value includes first partial information and second partial information, the first partial information is used to identify a CSI-RS resource, and the second partial information is used to identify a part that is of a comb resource and that is used to receive an interference measurement signal. A name of the identifier is not limited in this embodiment of this application. For example, the first partial information used to identify a CSI-RS resource is named as a CRI, and the second partial information used to identify a part that is of a comb resource and that is used to receive an interference measurement signal is named as a sub-CRI. In this case, when the interference measurement resource of the terminal device that is indicated by the first information includes a plurality of CSI-RS resources, to distinguish different CSI-RS resources, different CRIs may be used to correspond to different CSI-RS resources, and to distinguish different parts of the resource, different sub-CRIs may be used to correspond to the parts of the resource. Specifically, sub-CRIs corresponding to different parts of a same comb resource are different, and sub-CRIs corresponding to different parts of different comb resources are different. The CSI-RS resource shown in FIG. 7 is used as an example. Assuming that when each comb resource corresponds to two interference measurement signals, a resource used to receive an interference measurement signal is a part of the resource, the CSI-RS resource shown in FIG. 7 corresponds to 8 reported values at most. If the receive-end terminal device needs to send 8 reported values to the receive-end base station, on the CSI-RS resource, a part of the resource 1 corresponds to a reported value 1, a part of the resource 2 corresponds to a reported value 2, a part of the resource 3 corresponds to a reported value 3, a part of the resource 4 corresponds to a reported value 4, a part of the resource 5 corresponds to a reported value 5, a part of the resource 6 corresponds to a reported value 6, a part of the resource 7 corresponds to a reported value 7, and a part of the resource 8 corresponds to a reported value 8. A comb resource 1 of the CSI-RS resource includes the part of the resource 1 and the part of the resource 2, a comb resource 2 of the CSI-RS resource includes the part of the resource 3 and the part of the resource 4, a comb resource 3 of the CSI-RS resource includes the part of the resource 5 and the part of the resource 6, and a comb resource 4 of the CSI-RS resource includes the part of the resource 7 and the part of the resource 8. If CRI1 is used to identify the CSI-RS resource, sub-CRI1 is used to identify the part of the resource 1, sub-CRI2 is used to identify the part of the resource 2, sub-CRI3 is used to identify the part of the resource 3, sub-CRI4 is used to identify the part of the resource 4, sub-CRI5 is used to identify the part of the resource 5, sub-CRI6 is used to identify the part of the resource 6, sub-CRI7 is used to identify the part of the resource 7, and sub-CRI8 is used to identify the part of the resource 8, the receive-end terminal device further correspondingly sends, to the receive-end base station, the identifiers (CRI1 and sub-CRI1) corresponding to the reported value 1, the identifiers (CRI1 and sub-CRI2) corresponding to the reported value 2, the identifiers (CRI1, sub-CR13, and sub-sub-CRI) corresponding to the reported value 3, and the identifiers (CRI1 and sub-CR14) corresponding to the reported value 4, and by analogy, identifiers separately corresponding to the reported value 5, the reported value 6, the reported value 7, and the reported value 8.

Method 3: An identifier corresponding to a reported value includes one identifier, and is used to identify a part that is of a comb resource of a CSI-RS resource and that is used to receive an interference measurement signal. For example, the identifier may be named as a CRI. In this case, when the interference measurement resource of the terminal device that is indicated by the first information includes a plurality of CSI-RS resources, to distinguish different parts of the resource, CRIs corresponding to different parts of a same comb resource of a same CSI-RS resource are different, CRIs corresponding to different parts of different comb resources of a same CSI-RS resource are also different, and CRIs corresponding to different parts of comb resources of different CSI-RS resources are also different.

In this embodiment of this application, the identifier may include a plurality of pieces of partial information, and different partial information may indicate different content. The first partial information, the second partial information, or the third partial information do not indicate a location sequence of these pieces of partial information in the identifier.

The foregoing uses an example in which a CSI-RS resource includes a component CSI-RS RE pattern (4,1) for description. When a component CSI-RS RE pattern included in the CSI-RS resource is another component CSI-RS RE pattern, the identifier corresponding to the reported value may be configured by using a similar method.

In addition, optionally, the predefined reporting rule or the reporting rule indicated by the second information is used to indicate the identifier corresponding to the reported value, and the receive-end terminal device may send, to the receive-end base station, only the reported value corresponding to the identifier included in the predefined reporting rule or the reporting rule indicated by the second information. In this case, the receive-end terminal device may correspondingly send the identifier corresponding to the reported value to the receive-end base station, or may not send the identifier corresponding to the reported value. This is not limited in this embodiment of this application.

Optionally, when the predefined reporting rule or the reporting rule indicated by the second information includes a threshold, where the threshold is used to select a reported value, when the reported value is specifically an interference measurement result, the receive-end terminal device reports an interference measurement result of interference measurement results that is greater than or equal to the threshold to the receive-end base station. In this case, the receive-end terminal device needs to correspondingly send, to the receive-end base station, a resource identifier corresponding to the reported value greater than or equal to the threshold. In addition, when the predefined reporting rule or the reporting rule indicated by the second information includes a threshold and the reported value is specifically an interference measurement result, the receive-end terminal device reports an interference measurement result of interference measurement results that is less than the threshold to the receive-end base station. This is not limited in this embodiment of this application.

In addition, in this embodiment of this application, the receive-end terminal device may further determine, based on both the predefined reporting rule and the reporting rule indicated by the second information sent by the receive-end base station, the at least one reported value that needs to be sent to the receive-end base station.

It should be noted that the foregoing embodiment mainly describes that the reported value is used to indicate a status of interference to the receive-end terminal device by the transmit-end terminal device on the part of the resource. In addition, in this embodiment of this application, a reported value corresponding to an interference measurement result greater than a threshold may further be reported to the receive-end base station, or the reported value may be an average reported value of interference measurement results of the receive-end terminal device on a plurality of parts of the resource, or a reported value that is of reported values of interference measurement results on a plurality of parts of the resource and that is greater than a threshold, or the like. This is not limited in this embodiment of this application.

In this embodiment of this application, the predefined reporting rule or the reporting rule indicated by the second information is not limited to a quantity of reported values and an identifier and a threshold corresponding to the reported value, and may further be used to indicate that the reported value is an average reported value of interference measurement results on parts of the resource, or the like. This is not limited in this embodiment of this application.

In this embodiment of this application, the first information and the second information may be carried in a Radio Resource Control (radio resource control, RRC) message, or may be carried in other signaling, for example, signaling such as a broadcast message, a Media Access Control control element (MAC CE), a system information block (system information block, SIB), a master information block (MIB), or physical layer signaling (for example, downlink control information (DCI)). This is not limited in this embodiment of this application.

Specifically, in this embodiment of this application, it is assumed that higher layer signaling carries the first information and the second information, and it is assumed that the first information occupies X bits (bit) and the second information occupies M bits, where X and M are both positive integers greater than or equal to 1. It should be noted that a value of M depends on a class of the reporting rule. For example, there are N classes of reporting rules, where $M=[\log_2 N]$. In an example, when the resource used by the receive-end terminal device to perform interference measurement is an NZP CSI-RS resource, the first information may be a port quantity and a corresponding configuration index of the NZP CSI-RS resource, or the first information may be a bitmap (bitmap). If the resource used by the receive-end terminal device to perform interference measurement is another ZP or NZP RS resource, a data resource, or another existing or newly defined resource, the first information may still indicate the interference measurement resource by using the similar method of a port quantity or a bitmap or another method. In an example, it is assumed that the first information is a bitmap. It is assumed that the receive-end base station allocates 3 CSI-RS resources shown in FIG. 4*a* to the receive-end terminal device. A bit 0 is used to indicate that the CSI-RS resource is not the resource used by the receive-end terminal device to perform interference measurement, and a bit 1 is used to indicate that the CSI-RS resource is the resource used by the receive-end terminal device to perform interference measurement. If the first information is 111, it indicates that the 3 CSI-RS resources shown in FIG. 4*a* allocated by the receive-end base station to the receive-end terminal device are all interference measurement resources. It is assumed that there are only two classes of reporting rules. One class of reporting rule is reporting an average value of all interference measurement results, and the other class of reporting rule is reporting interference measurement results obtained through measurement. Only 1 bit is required to indicate the reporting rule in the second information, that is, the value of M is 1. Specifically, the first information and the second information may be shown in the following Table 1.

mit-end terminal devices. In this case, the CSI-RS resource may still correspond to a plurality of reported values. As shown in FIG. 7, the CSI-RS resource includes the comb resource 1, the comb resource 2, the comb resource 3, and the comb resource 4. In this case, the comb resources 1, 2, 3, and 4 may be considered as parts of the CSI-RS resource. A CRI is used to identify the CSI-RS resource. If two interference measurement signals can be multiplexed on each comb resource, the receive-end terminal device performs measurement on a part that is of the comb resource and that is used to receive an interference measurement signal, to obtain the interference measurement result. If the interference measurement result is a reported value, for a form of the resource identifier used to identify the reported value, refer to the method of using the resource identifier to distinguish a plurality of reported values corresponding to a same comb resource in this embodiment of this application. Details are not described herein again. In this case, the technical solution in this embodiment of this application is still applicable.

In this embodiment of this application, because the receive-end terminal device can send the reported value corresponding to the part of the resource to the receive-end base station, and the part of the resource is more likely to match a resource used by an interference measurement transmit end to send a measurement signal, this helps the receive-end base station obtain a more accurate status of interference caused by a terminal device to a terminal device.

In addition, FIG. 7 is used as an example. In this embodiment of this application, because the receive-end base station may allocate a plurality of CSI-RS resources shown in FIG. 7 to the receive-end terminal device, for each CSI-RS resource, the receive-end terminal device may send the reported value to the receive-end base station by using a

TABLE 1

| | First information (corresponding to 3 bits) | Second information (corresponding to 1 bit) | Corresponding action performed by a first device after the first device receives information sent by a second device |
|---|---|---|---|
| Configuration 1 | 111 | 0 | Report an average value of all interference measurement results |
| Configuration 2 | 111 | 1 | Report interference measurement results obtained through measurement |

The foregoing embodiment may further be applied to a case in which a pattern of the interference measurement resource of the receive-end terminal device and a pattern that is received by the receive-end terminal device and that is of the resource used to send an interference measurement signal may be matched. For example, the resource used by the receive-end terminal device to perform interference measurement is a CRI-RS resource similar to a comb. In this case, the CRI-RS resource may correspond to a comb resource, and each comb resource corresponds to a comb SRS. Because there are a relatively large quantity of receive-end terminal devices that measure inter-UE interference, the receive-end base station needs to configure many SRS resources for the receive-end terminal device. However, to reduce resource configuration overheads, the interference measurement resource configured by the transmit-end base station for the transmit-end terminal device at a time may still correspond to a plurality of comb resources, that is, may correspond to measurement signals of a plurality of transsame reporting rule, or may send the reported value to the receive-end base station by using different reporting rules. This is not limited in this embodiment of this application.

Embodiment 2

Figure 8:
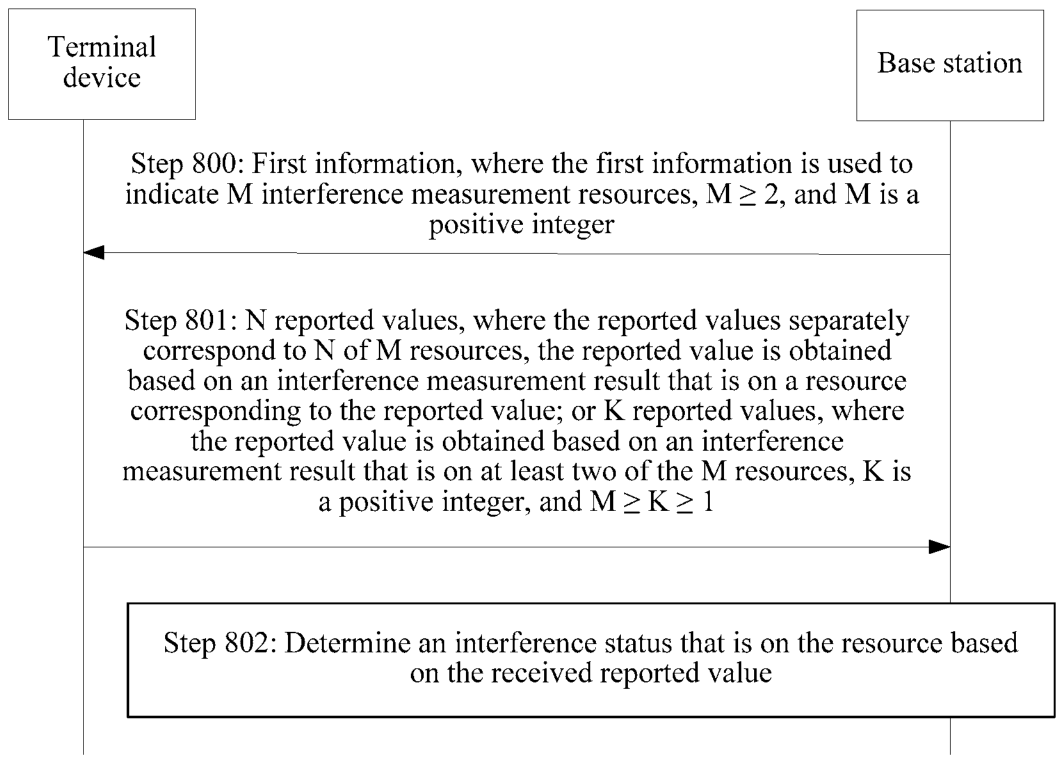
FIG. 8 is a schematic flowchart of a reporting method according to an embodiment of this application.

As shown in FIG. 8, an embodiment of this application further provides an interference measurement reporting method, including:

Step 800: A base station sends first information to a terminal device, where the first information is used to indicate M interference measurement resources to the terminal device, M≥2, and M is a positive integer.

Step 801: After receiving the first information sent by the base station, the terminal device sends N reported values to the base station, where the reported values separately correspond to N of M resources, the reported value is obtained based on an interference measurement result that is on a resource corresponding to the reported value, N is a positive integer, and M≥N≥2; or after receiving the first information sent by the base station, the terminal device sends K reported values to the base station, where the reported value is obtained based on an interference measurement result that is on at least two of the M resources, K is a positive integer, and M≥K≥1.

Step 802: After receiving the reported value, the base station determines an interference status that is on the resource based on the received reported value.

It should be noted that in the embodiments of this application, the terminal device in step 800 to step 802 is a receive-end terminal device, and the base station in step 800 to step 802 is a receive-end base station. Specifically, the receive-end terminal device is a terminal device that receives an interference measurement signal, performs interference measurement, and sends the reported value; and the receive-end base station is a base station that is used to allocate an interference measurement resource to the terminal device and receive the reported value.

In addition, correspondingly, there are further the following related concepts: a transmit-end terminal device is a terminal device used to send an interference measurement signal; and a transmit-end base station is used to indicate a signal used as an interference measurement signal to the transmit-end terminal device. FIG. 1*a* is used as an example. The terminal device 2 is a receive-end terminal device, the base station 2 is a receive-end base station, the terminal device 1 is a transmit-end terminal device, and the base station 1 is a transmit-end base station. FIG. 1*a* shows only one transmit-end terminal device and one sending base station. In an application scenario of the embodiments of this application, there may be a plurality of transmit-end terminal devices or a plurality of transmit-end base stations, and this is not limited.

The following uses the receive-end base station, the receive-end terminal device, the transmit-end base station, and the transmit-end terminal device to describe the embodiments of this application in detail.

In this embodiment of this application, the reported value sent by the terminal device to the base station may be obtained based on an interference measurement result that is on one resource, or may be obtained based on interference measurement results that are on a plurality of resources, or may be obtained based on a part of one resource as that in Embodiment 1. A method specifically used may be configured by a base station (or another access network device). The base station may configure one or more groups of resources for the terminal device, where each group of resources include one or more interference measurement resources. For a group of resources including a plurality of resources, the reported value may be obtained based on an interference measurement result that is on the resource. Three cases are included. In a first case, each resource of the group of resources corresponds to a reported value. In a second case, the group of resources correspond to a reported value, where the reported value is obtained based on interference measurement results that are on a plurality of or all of the group of resources. For example, the interference measurement results that are on the plurality of or all of the resources may be filtered to obtain an average or another operation is performed. A third case is similar to Embodiment 1, and one resource of the group of resources may correspond to a plurality of reported values.

When a pattern of each of M interference measurement resources configured by the receive-end base station for the receive-end terminal device matches that of a resource configured by the transmit-end base station for the transmit-end terminal device to send a measurement signal, if the receive-end terminal device receives, on each of the M resources, only a measurement signal sent by one transmit-end terminal device, each resource corresponds to one reported value, each of the M resources corresponds to a reported value, and the reported value is obtained based on an interference measurement result corresponding to the resource. In this case, the receive-end terminal device may send N reported values to the receive-end base station, N≤M, or the receive-end terminal device sends one reported value to the receive-end base station, where the reported value is an average value of M interference measurement results, or the receive-end terminal device sends one reported value to the receive-end base station, where the reported value is an average value of at least two of M interference measurement results, or the like. This is not limited in this embodiment of this application. In a specific reporting manner, reporting may be performed according to the predefined reporting rule or the reporting rule indicated by the second information sent by the receive-end base station to the receive-end terminal device. For a specific reporting rule, refer to the implementation in Embodiment 1. Details are not described again in this embodiment of this application.

When a pattern of each of M interference measurement resources configured by the receive-end base station for the receive-end terminal device does not match that of a resource configured by the transmit-end base station for the transmit-end terminal device to send a measurement signal, or when a pattern of each of M interference measurement resources configured by the receive-end base station for the receive-end terminal device includes a plurality of patterns of a resource configured by the transmit-end base station for the transmit-end terminal device to send a measurement signal, when the receive-end terminal device sends the reported value corresponding to a part of the M resources to the receive-end base station, for a reporting manner thereof, refer to that in Embodiment 1. Details are not described again in this embodiment of this application. In addition, when a pattern of each of M interference measurement resources configured by the receive-end base station for the receive-end terminal device does not match that of a resource configured by the transmit-end base station for the transmit-end terminal device to send a measurement signal, or when a pattern of each of M interference measurement resources configured by the receive-end base station for the receive-end terminal device includes a plurality of patterns of a resource configured by the transmit-end base station for the transmit-end terminal device to send a measurement signal, the M interference measurement resources configured by the receive-end base station for the receive-end terminal device may correspond to a reported value, and the reported value is an average value of all interference measurement results.

In addition, it should further be noted that interference measurement reporting methods may be the same or different for different groups of resources, and this is not limited in this embodiment of this application. For division of a group of resources, the receive-end base station may not allocate a resource in a form of a group of resources, and a plurality of resources that use a same reporting rule to perform interference measurement reporting are considered as a group of resources. Alternatively, the receive-end base station actually allocates a resource in a form of a group of resources, and indicates a reporting rule of the group of resources or predefines a reporting rule of the group of resources. In an example, this may be implemented by predefinition in a protocol. In an example, the M interference measurement resources of the terminal device may be different groups of resources. For example, A of M resources are a group of resources A and other B resources are a group of resources B. For the group of resources A, a reported value corresponding to each resource may be reported. For the group of resources B, an average value of interference measurement results corresponding to all of the group of resources B is reported.

In addition, It should further be noted that when the first information is used to indicate n interference measurement resources of the receive-end terminal device, there may be m corresponding reported values, where m is less than or equal to n. When m is equal to n, it is equivalent to that each resource corresponds to a reported value. In this case, a resource identifier may not need to be reported, and reporting may be performed based on a sequence agreed on. This is not limited in this embodiment of this application. When m is less than n, m resources are selected from n resources and interference measurement results that are on the m resources are reported. In this case, if the receive-end terminal device selects the interference measurement results that are on the n resources and that are to be reported, a corresponding resource identifier needs to be reported. If the receive-end base station specifies the interference measurement results that correspond to the n resources and that are to be reported, a resource identifier does not need to be reported. When m is equal to 1, an average value of the interference measurement results that are on the n resources may be reported. In this case, a resource identifier may not need to be reported either. This is not limited in this embodiment of this application. The n resources may not be all resources configured by the receive-end base station for the receive-end terminal device. The receive-end base station may configure a plurality of resources for the receive-end terminal device, where the n resources may be considered as a group of interference measurement resources. A reporting rule of another group of resources may be the same as or different from that of this group of resources.

In an actual implementation, the receive-end base station (or another access network device) may configure a plurality of groups of resources for the receive-end terminal device, where each group of resources include a plurality of resources. In this embodiment of this application, at least two resources that the first information is used to indicate may be an interference measurement reporting method of one of the plurality of groups of resources.

In addition, this embodiment of this application is further applicable to a case in which an interference measurement resource of a receive-end terminal device and an interference measurement signal do not match.

When an interference measurement resource of a receive-end terminal device and an interference measurement signal match, interference measurement signals sent by a plurality of transmit-end terminal devices may be multiplexed on a same resource. In this case, if the receive-end base station hopes to know interference information of a single transmit-end terminal device, in a reporting process, a resource still needs to be divided into a plurality of sub-resources used to receive an interference measurement signal. An identifier for identifying a sub-resource of the resource is used to distinguish different reported values. A specific method is the same as that in Embodiment 1.

Figure 1B:
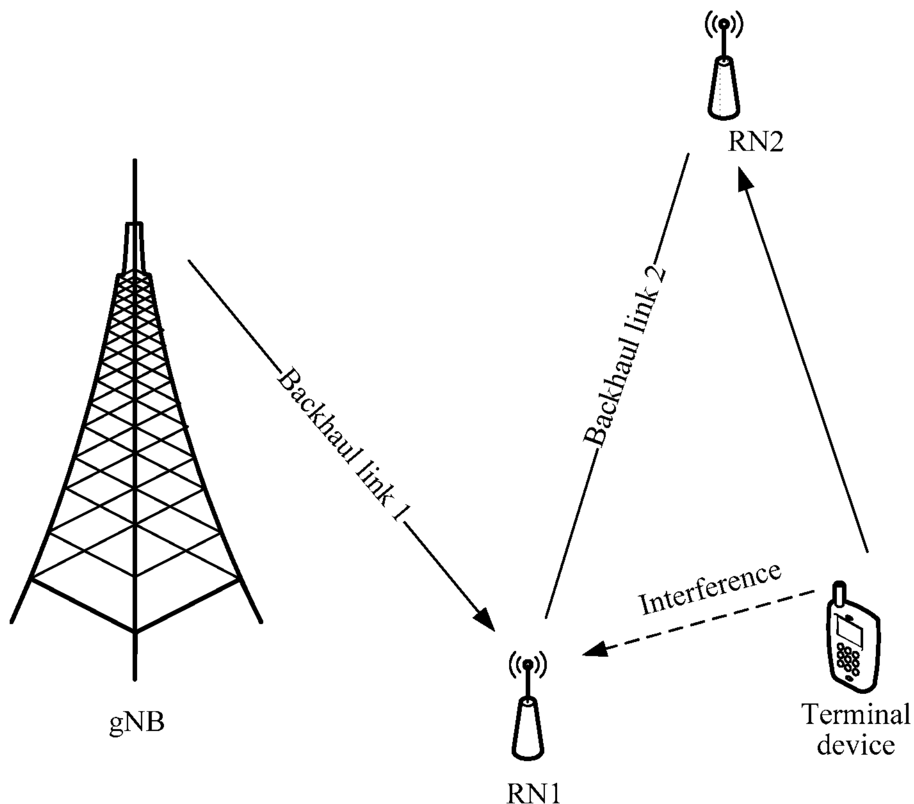

It should further be noted that in Embodiment 1 and Embodiment 2, an example of inter-UE interference measurement in a system in which the receive-end base station and the receive-end terminal device directly communicate with each other is used for description. Therefore, in the embodiments, equivalently, the first device is a terminal device, the second device is an access network device (a base station), and the third device is an access network device (a base station). In addition, in the embodiments, the second device and the third device may be a same access network device. This embodiment of this application is further applicable to a relay system, as shown in FIG. 1*b*, a D2D system, or the like. Therefore, the first device may be a terminal device or a relay device, the second device may be a relay device or an access network device, and the third device may be a terminal device, an access network device, a relay device, or the like, the second device and the third device may be a same device or different devices. This is not limited in this application of the present invention.

It should further be noted that the interference measurement signals in Embodiment 1 and Embodiment 2 may be SRSs, or may be signals such as CSI-RSs. This is not limited in the embodiments of this application.

In addition, for a part of the specific implementation of Embodiment 2 that is similar to or the same as the specific implementation of Embodiment 1, refer to the specific implementation of Embodiment 1, and details are not described herein again.

Based on a similar idea, this embodiment of this application further provides a first device, where the first device is configured to perform actions or functions of the first device in the foregoing method embodiment.

Based on a similar idea, this embodiment of this application further provides a network side device, where the network side device is configured to perform actions or functions of the network side device in the foregoing method embodiment.

An embodiment of the present invention further provides a communications system, including the first device and the network side device in the foregoing embodiments.

For brevity, for the content of the aforementioned apparatus, refer to the foregoing description of the method embodiment, and repeated parts are not described in detail again.

Figure 9A:
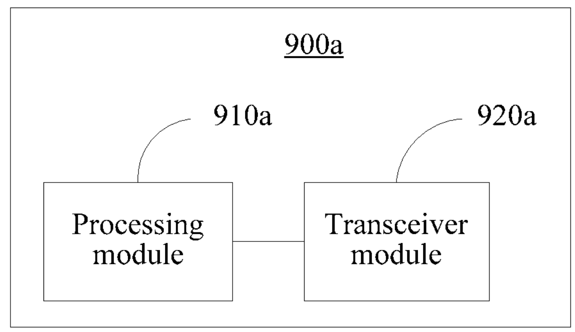
FIG. 9*a* and FIG. 9*b* are schematic structural diagrams of a first device according to an embodiment of this application.

As shown in FIG. 9*a*, a first device 900*a* in an embodiment of this application includes: a processing module 910*a* and a transceiver module 920*a*, where the transceiver module 920*a* is configured to receive first information sent by a second device and send at least one reported value to a third device, where the first information is used to indicate an interference measurement resource to the first device; and the reported value is obtained by the processing module 910*a* based on an interference measurement result that is on a part of the resource.

In a possible design, the resource indicated by the first information includes at least one of a time domain resource, a frequency domain resource, and a code domain resource.

In a possible design, the transceiver module 920*a* is further configured to send an identifier corresponding to the reported value to the third device, where the identifier is used to identify the part of the resource.

In a possible design, the transceiver module 920*a* is further configured to: receive second information sent by the second device, and send the at least one reported value to the third device based on the second information, where the second information is used to indicate a reporting rule.

In a possible design, the transceiver module 920*a* is configured to send the at least one reported value to the third device according to a predefined reporting rule.

In a possible design, the reporting rule indicated by the second information or the predefined reporting rule is used to indicate at least one of a quantity of reported values, the identifier corresponding to the reported value, and a threshold, and the threshold is used to select the reported value.

In a possible design, the reported value is a channel quality indicator (CQI), reference signal received power (RSRP), reference signal received quality (RSRQ), a received signal strength indicator (RSSI), or channel state information (CSI).

In a possible design, the first device is a terminal device, and the second device and the third device are a same access network device; or the first device is a terminal device, the second device is a relay device, and the third device is an access network device; or the first device is a terminal device, the second device is a first relay device, and the third device is a second relay device; or the first device is a first terminal device, the second device is an access network device, and the third device is a second terminal device; or the first device is a relay device, and the second device and the third device are a same access network device; or the first device is a first relay device, the second device is a second relay device, and the third device is an access network device.

Figure 9B:
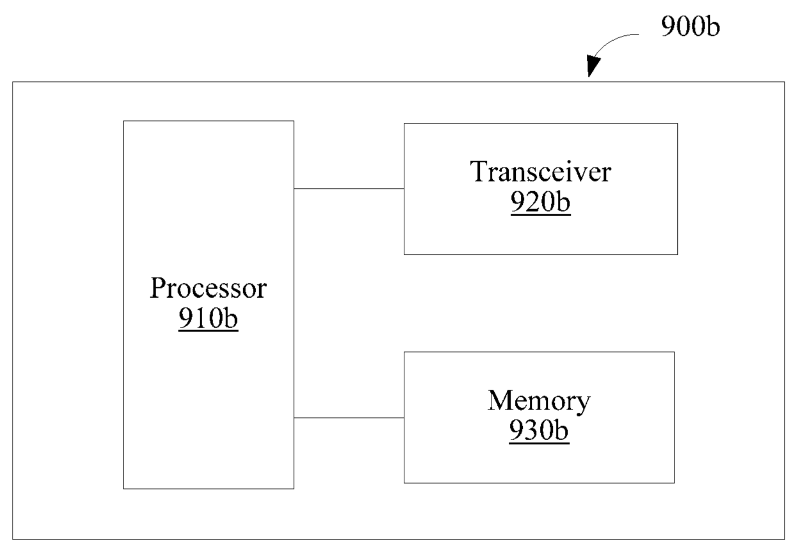

It should be noted that in this embodiment of this application, the processing module 910*a* may be implemented by a processor, and the transceiver module 920*a* may be implemented by a transceiver. Specifically, as shown in FIG. 9*b*, a first device 900*b* may include a processor 910*b*, a transceiver 920*b*, and a memory 930*b*. The transceiver 920*b* includes the receiver and the transmitter. The memory 930*b* may be configured to store a program/code pre-installed when the first device 900*b* is delivered from a factory, or may store code executed by the processor 910*b*, or the like.

The processor 910*b* may be a general-purpose central processing unit (CPU), a microprocessor, an application-specific integrated circuit (ASIC), or one or more integrated circuits, and is configured to perform a related operation, so as to implement the technical solution provided in this embodiment of this application.

It should be noted that, although only the processor 910*b*, the transceiver 920*b*, and the memory 930*b* are shown for the first device 900*b* shown in FIG. 9*b*, in a specific implementation process, persons skilled in the art should understand that the first device 900*b* further includes another component necessary for normal operation. In addition, according to a specific requirement, persons skilled in the art should understand that the first device 900*b* may further include a hardware component that implements additional function or functions. In addition, persons skilled in the art should understand that the first device 900*b* may alternatively include only a component or module necessary for implementing this embodiment of this application, but does not need to include all components shown in FIG. 9*b*.

Persons of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may be a magnetic disk, an optical disc, a read-only memory (ROM), a random access memory (RAM), or the like.

Figure 10A:
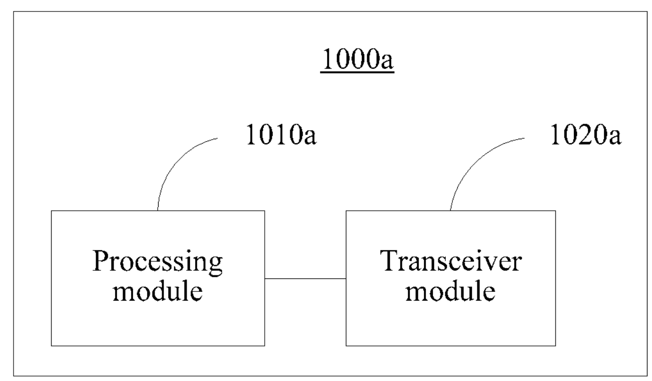
FIG. 10*a* and FIG. 10*b* are schematic structural diagrams of a network side device according to an embodiment of this application.

As shown in FIG. 10*a*, a network side device 1000*a* in an embodiment of this application includes: a processing module 1010*a* and a transceiver module 1020*a*, where the transceiver module 1020*a* is configured to: send first information to a first device, and receive at least one reported value sent by the first device, where the first information is used to indicate an interference measurement resource to the first device, and the reported value is obtained by the processing module 1010*a* based on an interference measurement result that is on a part of the resource.

In a possible design, the network side device includes a second device and a third device; a transceiver module of the second device is configured to send first information to a first device; and a transceiver module of the third device is configured to receive at least one reported value sent by the first device.

In a possible design, the transceiver module is further configured to receive an identifier that corresponds to the reported value and that is sent by the first device, where the identifier is used to identify the part of the resource. It should be noted that when the network side device includes the second device and the third device, the transceiver module of the third device is further configured to receive an identifier that corresponds to the reported value and that is sent by the first device.

In a possible design, the transceiver module is further configured to send second information to the first device, where the second information is used to indicate a reporting rule. It should be noted that when the network side device includes the second device and the third device, the transceiver module of the second device is further configured to send second information to the first device.

In a possible design, the reporting rule is used to indicate at least one of a plurality of reported values, the identifier corresponding to the reported value, and a threshold, and the threshold is used to select the reported value.

In a possible design, when the network side device includes the second device and the third device, the first device is a terminal device, and the second device and the third device are a same access network device; or the first device is a terminal device, the second device is a relay device, and the third device is an access network device; or the first device is a terminal device, the second device is a first relay device, and the third device is a second relay device; or the first device is a first terminal device, the second device is an access network device, and the third device is a second terminal device; or the first device is a relay device, and the second device and the third device are a same access network device; or the first device is a first relay device, the second device is a second relay device, and the third device is an access network device.

In a possible design, the resource includes at least one of a time domain resource, a frequency domain resource, and a code domain resource.

In a possible design, the reported value is a channel quality indicator (CQI), reference signal received power (RSRP), reference signal received quality (RSRQ), a received signal strength indicator (RSSI), or channel state information (CSI).

Figure 10B:
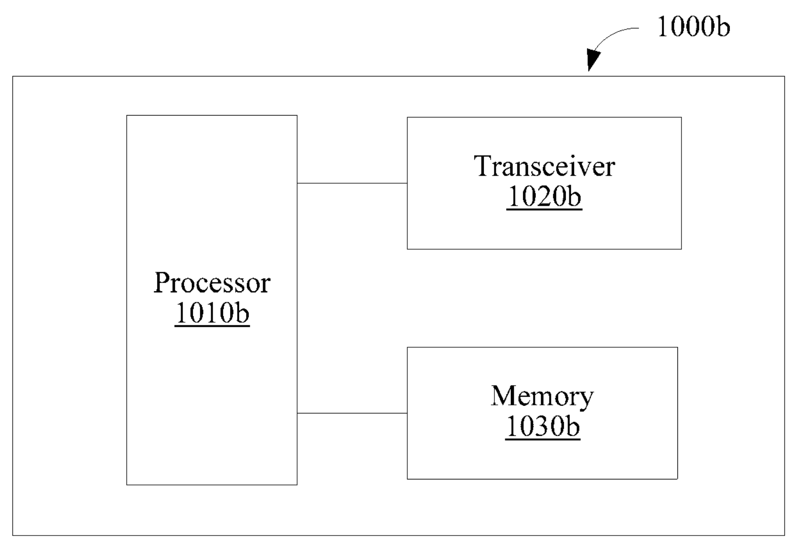

It should be noted that in this embodiment of this application, the processing module 1010*a* may be implemented by a processor, and the transceiver module 1020*a* may be implemented by a transceiver. Specifically, as shown in FIG. 10*b*, the network side device 1000*b* may include a processor 1010*b*, a transceiver 1020*b*, and a memory 1030*b*. The transceiver 1020*b* includes the receiver and the transmitter, the memory 1030*b* may be configured to store a program/code pre-installed when the network side device 1000*b* is delivered from a factory, or may store code executed by the processor 1010*b*, or the like.

The processor 1010*b* may be a general-purpose CPU, a microprocessor, an ASIC, or one or more integrated circuits, and is configured to perform a related operation, so as to implement the technical solution provided in this embodiment of this application.

It should be noted that although only the processor 1010*b*, the transceiver 1020*b*, and the memory 1030*b* are shown for the network side device 1000*b* shown in FIG. 10*b*, in a specific implementation process, persons skilled in the art should understand that the network side device 1000*b* may further include another component necessary for normal operation. In addition, persons skilled in the art should understand that, based on a specific requirement, the network side device 1000*b* may further include a hardware component for implementing another additional function. In addition, persons skilled in the art should understand that the network side device 1000*b* may include only components or modules necessary for implementing this embodiment of this application, but does not need to include all the components shown in FIG. 10*b*.

Persons of ordinary skill in the art may understand that all or some of the processes of the methods in the embodiments may be implemented by a computer program controlling relevant hardware. The program may be stored in a computer readable storage medium. When the program runs, the methods in the embodiments are performed. The foregoing storage medium may be a magnetic disk, an optical disk, a ROM, a RAM, or the like.

Figure 11:
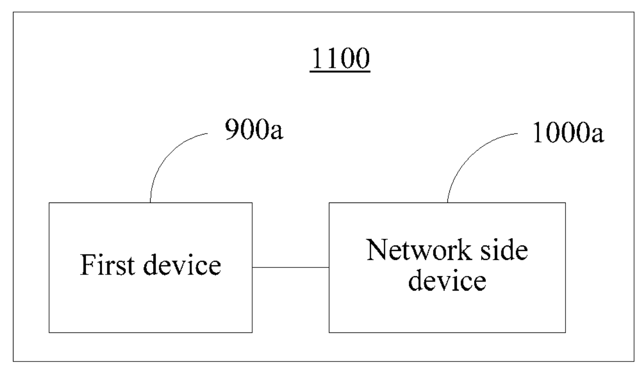
FIG. 11 is a schematic structural diagram of a communications system according to an embodiment of this application.

As shown in FIG. 11, a communications system in an embodiment of this application includes the first device 900*a* and the network side device 1000*a*.

Figure 12A:
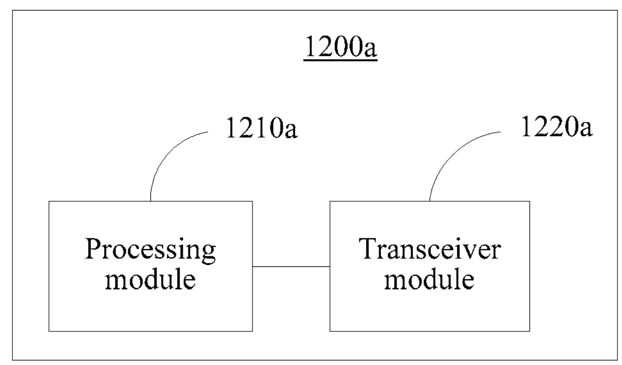
FIG. 12*a* and FIG. 12*b* are schematic structural diagrams of a first device according to an embodiment of this application.

As shown in FIG. 12*a*, a first device 1200*a* in an embodiment of this application includes: a processing module 1210*a* and a transceiver module 1220*a*, where the transceiver module 1220*a* is configured to receive first information sent by a second device, where the first information is used to indicate M interference measurement resources to the first device, M≥2, and M is a positive integer; and the transceiver module 1220*a* is configured to send N reported values to a third device, where the reported values separately correspond to N of the M resources, the reported value is obtained by the processor 1210*a* based on an interference measurement result that is on the resource corresponding to the reported value, N is a positive integer, and M≥N≥2; or the transceiver module is configured to send K reported values to a third device, where the reported value is obtained based on interference measurement results that are on the at least two of the M resources, K is a positive integer, and M≥K≥1.

In a possible design, the reported value is a channel quality indicator (CQI), reference signal received power (RSRP), reference signal received quality (RSRQ), a received signal strength indicator (RSSI), or channel state information (CSI).

In a possible design, the transceiver module 1220*a* is configured to send an identifier corresponding to the reported value to the third device, where the identifier is used to identify the resource.

In a possible design, the transceiver module 1220*a* is configured to: receive second information sent by the second device, and send the at least one reported value to the third device based on the second information, where the second information is used to indicate a reporting rule.

In a possible design, the transceiver module 1220*a* is configured to send the at least one reported value to the third device according to a predefined reporting rule.

In a possible design, the reporting rule indicated by the second information or the predefined reporting rule is used to indicate at least one of a quantity of reported values, the identifier corresponding to the reported value, and a threshold, and the threshold is used to select the reported value.

In a possible design, the first device is a terminal device, and the second device and the third device are a same access network device; or the first device is a terminal device, the second device is a relay device, and the third device is an access network device; or the first device is a terminal device, the second device is a first relay device, and the third device is a second relay device; or the first device is a first terminal device, the second device is an access network device, and the third device is a second terminal device; or the first device is a relay device, and the second device and the third device are a same access network device; or the first device is a first relay device, the second device is a second relay device, and the third device is an access network device.

Figure 12B:
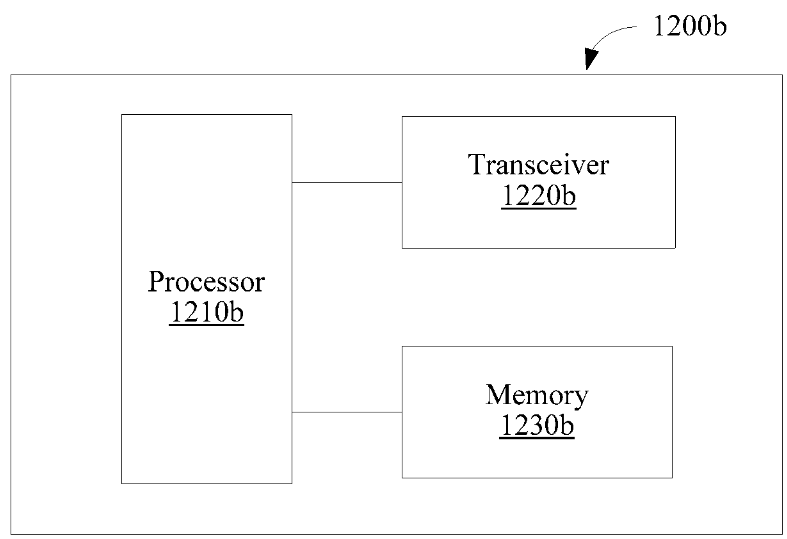

It should be noted that in this embodiment of this application, the processing module 1210*a* may be implemented by a processor, and the transceiver module 1220*a* may be implemented by a receiver. Specifically, as shown in FIG. 12*b*, the first device 1200*b* may include a processor 1210*b*, a transceiver 1220*b*, and a memory 1230*b*. The transceiver 1220*b* includes the receiver and the transmitter, the memory 1230*b* may be configured to store a program/code preinstalled when the first device 1200*b* is delivered from a factory, or may store code executed by the processor 1210*b*, or the like.

The processor 1210*b* may be a general-purpose CPU, a microprocessor, an ASIC, or one or more integrated circuits, and is configured to perform a related operation, so as to implement the technical solution provided in this embodiment of this application.

It should be noted that, although only the processor 1210*b*, the transceiver 1220*b*, and the memory 1230*b* are shown for the first device 1200*b* shown in FIG. 12*b*, in a specific implementation process, persons skilled in the art should understand that the first device 1200*b* further includes another component necessary for normal operation. In addition, according to a specific requirement, persons skilled in the art should understand that the first device 1200*b* may further include a hardware component that implements another additional function. In addition, persons skilled in the art should understand that the first device 1200*b* may alternatively include only a component or module necessary for implementing this embodiment of this application, but does not need to include all components shown in FIG. 12*b*.

Persons of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may be a magnetic disk, an optical disk, a ROM, a RAM, or the like.

Figure 13A:
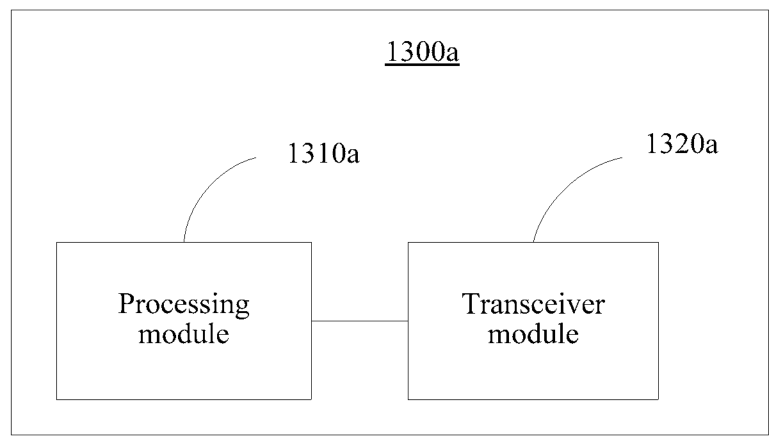
FIG. 13*a* and FIG. 13*b* are schematic structural diagrams of a network side device according to an embodiment of this application.

As shown in FIG. 13*a*, a network side device 1300*a* in an embodiment of this application includes: a processing module 1310*a* and a transceiver module 1320*a*, where the transceiver module 1320*a* is configured to send first information to a first device, where the first information is used to indicate M interference measurement resources to the first device, M≥2, and M is a positive integer; and the transceiver module 1320*a* is configured to receive N reported values sent by the first device, where the reported values separately correspond to N of the M resources, the reported value is obtained by the processor 1310*a* based on an interference measurement result that is on the resource corresponding to the reported value, N is a positive integer, and M≥N≥2; or the transceiver module 1320*a* is configured to receive K reported values sent by the first device, where the reported value is obtained by the processing module 1310*a* based on interference measurement results that are on the at least two of the M resources, K is a positive integer, and M≥K≥1.

In a possible design, the reported value is a channel quality indicator (CQI), reference signal received power (RSRP), reference signal received quality (RSRQ), a received signal strength indicator (RSSI), or channel state information (CSI).

In a possible design, the network side device includes a second device and a third device; a transceiver module of the second device is configured to send first information to a first device; and a transceiver module of the third device is configured to receive N reported values sent by the first device, or the transceiver module of the third device receives K reported values sent by the first device.

In a possible design, the transceiver module is configured to receive an identifier that corresponds to the reported value and that is sent by the first device, where the identifier is used to identify the resource. It should be noted that when the network side device includes the second device and the third device, the transceiver module of the third device is configured to receive an identifier that corresponds to the reported value and that is sent by the first device.

In a possible design, the transceiver module of the second device is configured to send second information to the first device, where the second information is used to indicate a reporting rule. It should be noted that when the network side device includes the second device and the third device, the transceiver module of the second device is configured to send second information to the first device.

In a possible design, the reporting rule is used to indicate at least one of a quantity of reported values, the identifier corresponding to the reported value, and a threshold, and the threshold is used to select the reported value.

In a possible design, when the network side device includes the second device and the third device, the first device is a terminal device, and the second device and the third device are a same access network device; or the first device is a terminal device, the second device is a relay device, and the third device is an access network device; or the first device is a terminal device, the second device is a first relay device, and the third device is a second relay device; or the first device is a first terminal device, the second device is an access network device, and the third device is a second terminal device; or the first device is a relay device, and the second device and the third device are a same access network device; or the first device is a first relay device, the second device is a second relay device, and the third device is an access network device.

Figure 13B:
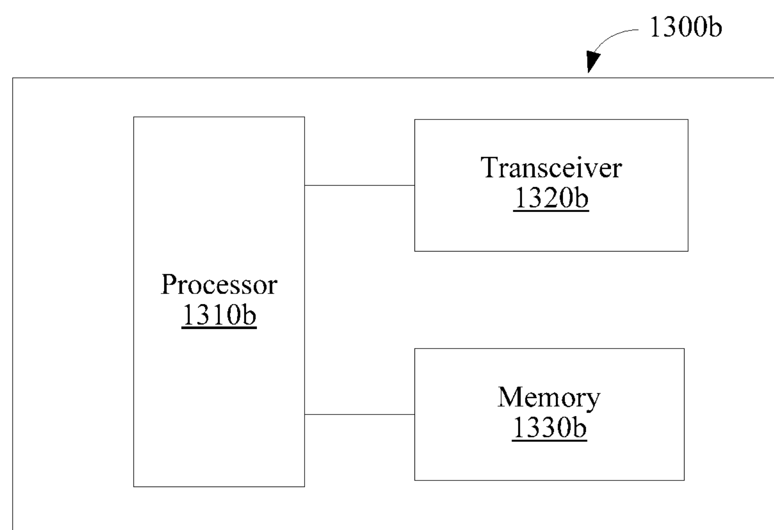

It should be noted that in this embodiment of this application, the processing module 1310*a* may be implemented by a processor, and the transceiver module 1320*a* may be implemented by a transceiver. Specifically, as shown in FIG. 13*b*, the network side device 1300*b* may include a processor 1310*b*, a transceiver 1320*b*, and a memory 1330*b*. The transceiver 1320*b* includes the receiver and the transmitter, the memory 1330*b* may be configured to store a program/code pre-installed when the network side device 1300*b* is delivered from a factory, or may store code executed by the processor 1310*b*, or the like.

The processor 1310*b* may be a general-purpose CPU, a microprocessor, an ASIC, or one or more integrated circuits, and is configured to perform a related operation, so as to implement the technical solution provided in this embodiment of this application.

It should be noted that although only the processor 1310*b*, the transceiver 1320*b*, and the memory 1330*b* are shown for the network side device 1300*b* shown in FIG. 13*b*, in a specific implementation process, persons skilled in the art should understand that the network side device 1300*b* further includes another component necessary for normal running. In addition, persons skilled in the art should understand that, based on a specific requirement, the network side device 1300*b* may further include a hardware component for implementing another additional function. In addition, persons skilled in the art should understand that the network side device 1300*b* may include only components or modules necessary for implementing this embodiment of this application, but does not need to include all the components shown in FIG. 13*b*.

Persons of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may be a magnetic disk, an optical disk, a ROM, a RAM, or the like.

Figure 14:
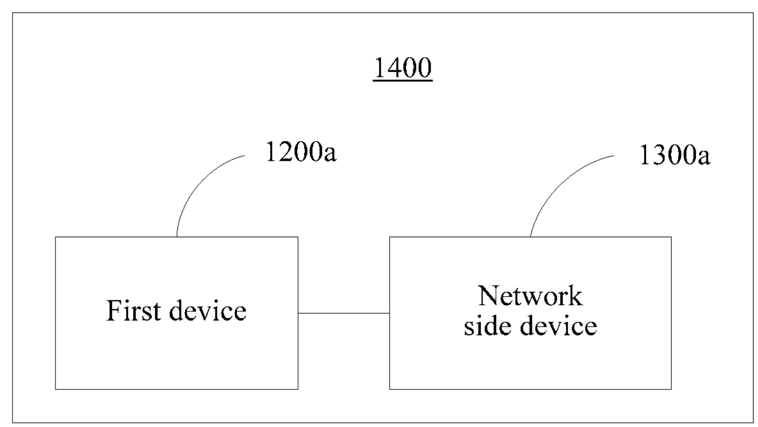
FIG. 14 is a schematic structural diagram of a communications system according to an embodiment of this application.

As shown in FIG. 14, a communications system 1400 in an embodiment of this application includes the first device 1200*a* and the network side device 1300*a*.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

Although some possible embodiments of this application have been described, persons skilled in the art can make changes and modifications to these embodiments once they learn the basic inventive concept. Therefore, the following claims are intended to be construed to cover the embodiments of this application and all changes and modifications falling within the scope of this application.

Apparently, persons skilled in the art can make various modifications and variations to this application without departing from the spirit and scope of this application. This application is intended to cover these modifications and variations of this application provided that they fall within the scope defined by the following claims and their equivalent technologies.

What is claimed is:

1. A reporting method, wherein the method comprises:

receiving, by a first device, first information sent by a second device, wherein the first information is used to indicate an interference measurement resource to the first device; and sending, by the first device, at least one reported value and a CSI-RS resource indicator (CRI) identifier corresponding to the at least one reported value to a third device, wherein the at least one reported value is obtained based on an interference measurement result measured by the first device on a comb resource of the interference measurement resource and the CRI identifier identifies the comb resource.

2. The method according to claim 1, wherein the method further comprises:

receiving, by the first device, second information sent by the second device, wherein the second information is used to indicate a reporting rule; and wherein the sending, by the first device, of the at least one reported value and the identifier to a third device comprises:

sending, by the first device, the at least one reported value and the identifier to the third device based on the second information.

3. The method according to claim 1, wherein the sending, by the first device, of the at least one reported value and the identifier to a third device comprises:

sending, by the first device, the at least one reported value and the identifier to the third device according to a predefined reporting rule.

4. The method according to claim 3, wherein the predefined reporting rule is used to indicate at least one of a quantity of reported values, the identifier corresponding to the reported value, and a threshold; and wherein the threshold is used to select the reported value.

5. A report receiving method, wherein the method comprises:

sending, by a network side device, first information to a first device, wherein the first information is used to indicate an interference measurement resource to the first device; and receiving, by the network side device, at least one reported value and a CSI-RS resource indicator (CRI) identifier corresponding to the at least one reported value sent by the first device, wherein the reported value is obtained based on an interference measurement result measured by the first device on a comb resource in the interference measurement resource and the identifier identifies the comb resource.

6. The method according to claim 5, wherein the method further comprises:

sending, by the network side device, second information to the first device, wherein the second information is used to indicate a reporting rule.

7. The method according to claim 6, wherein the reporting rule is used to indicate at least one of a quantity of reported values, the identifier corresponding to the reported value, and a threshold, and wherein the threshold is used to select the reported value.

8. The method according to claim 5, wherein the resource comprises at least one of a time domain resource, a frequency domain resource, and a code domain resource.

9. A first device, comprising:

a memory storing instructions; and a processor coupled to the memory configured to execute the instructions to:

receive first information sent by a second device; and send at least one reported value and a CSI-RS resource indicator (CRI) identifier to a network side device, wherein the identifier corresponds to the at least one reported value;

wherein the first information is used to indicate an interference measurement resource to the first device, the reported value is obtained by the processor based on an interference measurement result obtained from performing inference measurement on a comb resource in the interference measurement resource, and the CRI identifier is used to identify the comb resource.

10. The first device according to claim 9, wherein the processor coupled to the memory is further configured to execute the instructions to:

receive second information sent by the second device, wherein the second information is used to indicate a reporting rule; and send at least one reported value and the identifier to the network side device based on the second information.

11. The first device according to claim 10, wherein the processor is configured to execute the instructions to:

send the at least one reported value and the identifier to the network side device according to a predefined reporting rule.

12. The first device according to claim 11, wherein the reporting rule or the predefined reporting rule is used to indicate at least one of a quantity of reported values, the identifier corresponding to the reported value, and a threshold, and wherein the threshold is used to select the reported value.

13. A device, comprising:

a memory storing instructions; and a processor coupled to the memory configured to execute the instructions to:

send first information to a first device; and receive at least one reported value and a CSI-RS resource indicator (CRI) identifier sent by the first device, wherein the identifier corresponds to the at least one reported value;

wherein the first information is used to indicate an interference measurement resource to the first device; and the reported value indicates an interference measurement result that is obtained by the first device by performing an interference measurement on a comb resource in the interference measurement resource; and wherein the CRI identifier identifies the comb resource.

14. The device according to claim 13, wherein the processor coupled to the memory is further configured to execute the instructions to:

send second information to the first device, wherein the second information is used to indicate a reporting rule.

15. The device according to claim 13, wherein the reporting rule is used to indicate at least one of a quantity of reported values, a resource identifier corresponding to the reported value, and a threshold, and wherein the threshold is used to select the reported value.

16. The device according to claim 13, wherein the resource comprises at least one of a time domain resource, a frequency domain resource, and a code domain resource.

* * * * *

UNITED STATES PATENT AND TRADEMARK OFFICE
CERTIFICATE OF CORRECTION

PATENT NO. : 11,337,094 B2
APPLICATION NO. : 16/713078
DATED : May 17, 2022
INVENTOR(S) : Ming Wu et al.

It is certified that error appears in the above-identified patent and that said Letters Patent is hereby corrected as shown below:

On the Title Page

In item (57), in Column 2, in "Abstract", Line 9, after "portion" insert -- of --.

Signed and Sealed this
Second Day of August, 2022

Katherine Kelly Vidal
Director of the United States Patent and Trademark Office